US012386739B2

(12) United States Patent
Zhang et al.

(10) Patent No.: US 12,386,739 B2
(45) Date of Patent: Aug. 12, 2025

(54) MEMORY SYSTEM AND OPERATION METHOD THEREOF AND MEMORY CONTROLLER

(71) Applicant: YANGTZE MEMORY TECHNOLOGIES CO., LTD., Wuhan (CN)

(72) Inventors: Zhe Zhang, Wuhan (CN); Xue Wu, Wuhan (CN); Wei Wu, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 0 days.

(21) Appl. No.: 18/618,593

(22) Filed: Mar. 27, 2024

(65) Prior Publication Data

US 2025/0103485 A1 Mar. 27, 2025

(30) Foreign Application Priority Data

Sep. 26, 2023 (CN) ......................... 202311255305.2

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
None
See application file for complete search history.

(56) References Cited

U.S. PATENT DOCUMENTS

2014/0208068 A1* 7/2014 Wegener ................. H03M 7/24 712/22
2015/0347231 A1* 12/2015 Gopal ................. H03M 13/159 714/764
2019/0326930 A1* 10/2019 Palangappa ........ H03M 13/1117
2021/0091884 A1* 3/2021 Kim .......................... H04L 1/00
2024/0297666 A1* 9/2024 Hwang .............. H03M 13/1177

* cited by examiner

*Primary Examiner* — Stephanie Wu
(74) *Attorney, Agent, or Firm* — Conley Rose, P.C.

(57) ABSTRACT

A memory system includes a memory device, and a memory controller which is coupled with the memory device and configured to: compress a first mapping table, to obtain a second mapping table, wherein the first mapping table includes a correspondence relation between an exponent portion of each element of all elements corresponding to an error correction coding equation and an equation coefficient, the exponent portions of all the elements are a group of continuous data; the second mapping table includes a correspondence relation between the exponent portions of part of all the elements and the equation coefficients, the exponent portions of the part of the elements comprise a plurality of pieces of node data extracted from the continuous data; and acquire the equation coefficient corresponding to the exponent portion of any element of all the elements using the node data in the second mapping table through a segmented query.

20 Claims, 21 Drawing Sheets

| i | 0 | 1 | 256 | 512 | ...... | 256*254 | 256*255 | 256*256-1 |
|---|---|---|---|---|---|---|---|---|
| gfilog[i] | 1 | 2 | 2863 | 5790 | ...... | 19966 | 28852 | None |

| | | | | | | |
|---|---|---|---|---|---|---|
| 1 | 1 | 1 | 1 | ...... | 1 | 1 |
| 1^1 | x^1 | x^2 | x^3 | ...... | x^(n-2) | x^(n-1) |
| 1^2 | (x^1)^2 | (x^2)^2 | (x^3)^2 | ...... | (x^(n-2))^2 | (x^(n-1))^2 |
| 1^3 | (x^1)^3 | (x^2)^3 | (x^3)^3 | ...... | (x^(n-2))^3 | (x^(n-1))^3 |
| ...... | ...... | ...... | ...... | ...... | ...... | ...... |
| 1^(k-2) | (x^1)^(k-2) | (x^2)^(k-2) | (x^3)^(k-2) | ...... | (x^(n-2))^(k-2) | (x^(n-1))^(k-2) |
| 1^(k-1) | (x^1)^(k-1) | (x^2)^(k-1) | (x^3)^(k-1) | ...... | (x^(n-2))^(k-1) | (x^(n-1))^(k-1) |

k (rows)

n (columns)

FIG. 8B

| | | | | | | |
|---|---|---|---|---|---|---|
| 1 | 1 | 1 | 1 | ...... | 1 | 1 |
| 1 | GF(1) | GF(2) | GF(3) | ...... | GF(n-2) | GF(n-1) |
| 1 | GF(2) | GF(4) | GF(6) | ...... | GF(2(n-2)) | GF(2(n-1)) |
| 1 | GF(3) | GF(6) | GF(9) | ...... | GF(3(n-2)) | GF(3(n-1)) |
| ...... | ...... | ...... | ...... | ...... | ...... | ...... |
| 1 | GF(k-2) | GF(2(k-2)) | GF(6) | ...... | GF((k-2)(n-2)) | GF((k-2)(n-1)) |
| 1 | GF(k-1) | GF(2(k-1)) | GF(9) | ...... | GF((k-1)(n-2)) | GF((k-1)(n-1)) |

k (rows), n (columns)

FIG. 8C

EQUATION COEFFICIENT MATRIX

| | | | | | |
|---|---|---|---|---|---|
| 1 | 1 | 1 | 1 | 1 | 1 |
| 1 | GF(2^1) | GF(2^2) | GF(2^3) | GF(2^4) | GF(2^5) |
| 1 | GF(2^2) | GF(2^4) | GF(2^6) | GF(2^8) | GF(2^10) |

FIG. 8D

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| gflog[i] | — | 0 | 1 | 4 | 2 | 8 | 5 | 10 | 3 | 14 | 9 | 7 | 6 | 13 | 11 | 12 |
| gfilog[i] | 1 | 2 | 4 | 8 | 3 | 6 | 12 | 11 | 5 | 10 | 7 | 14 | 15 | 13 | 9 | — |

FIG. 9

| i | 0 | 1 | ...... | 256 | ...... | 512 | ...... | 256*254 | ...... | 256*256-2 | 256*256-1 |
|---|---|---|---|---|---|---|---|---|---|---|---|
| gflog[i] | 1 | 2 | ...... | 2863 | ...... | 5790 | ...... | 19966 | ...... | ...... | None |

FIG. 10A

| i | 0 | 1 | 256 | 512 | ...... | 256*254 | 256*255 | 256*256-1 |
|---|---|---|---|---|---|---|---|---|
| gflog[i] | 1 | 2 | 2863 | 5790 | ...... | 19966 | 28852 | None |

FIG. 10B

FIRST MATRIX → SECOND MATRIX → INVERSE MATRIX $$\begin{pmatrix} 1 & 1 & 1 \\ 1 & x^2 & x^5 \\ 1 & x^4 & x^{10} \end{pmatrix} \Rightarrow \begin{pmatrix} 1 & 1 & 1 \\ 1 & 4 & 6 \\ 1 & 3 & 7 \end{pmatrix} \Rightarrow \begin{pmatrix} 3 & 13 & 15 \\ 14 & 2 & 12 \\ 12 & 15 & 3 \end{pmatrix}$$

FIG. 12A

THIRD MATRIX $$\begin{pmatrix} 1 & 1 & 1 \\ 1 & x^2 & x^5 \\ 1 & x^4 & x^{10} \end{pmatrix} \times \begin{pmatrix} D0 \\ D2 \\ D5 \end{pmatrix} = \begin{pmatrix} D0+D2+D5 \\ D0+x^2 \cdot D2+x^5 \cdot D5 \\ D0+x^4 \cdot D2+x^{10} \cdot D5 \end{pmatrix}$$

FIG. 12B $$\begin{pmatrix} D0 \\ D2 \\ D5 \end{pmatrix} = \begin{pmatrix} 3 & 13 & 15 \\ 14 & 2 & 12 \\ 12 & 15 & 3 \end{pmatrix} \times \begin{pmatrix} P1+D1+D3+D4 \\ P2+x^1*D1+x^3*D3+x^4*D4 \\ P3+x^2*D1+x^6*D3+x^8*D4 \end{pmatrix}$$

$$\begin{pmatrix} D0 \\ D2 \\ D5 \end{pmatrix} = \begin{pmatrix} 3 & 13 & 15 \\ 14 & 2 & 12 \\ 12 & 15 & 3 \end{pmatrix} \times \begin{pmatrix} P1+D1+D3+D4 \\ P2+D1*2+D3*8+D4*3 \\ P3+D1*4+D3*12+D4*5 \end{pmatrix}$$

| | | |
|---|---|---|
| D0 | = | 3*P1+13*P2+15*P3+3*D1+9*D3+D4 |
| D2 | = | 14*P1+2*P2+12*P3+15*D1+2*D3+D4 |
| D5 | = | 12*P1+15*P2+3*P3+13*D1+10*D3+D4 |

FIG. 12C

| | | |
|---|---|---|
| D0 | = | x^4*P1+x^13*P2+x^12*P3+x^4*D1+x^14*D3+D4 |
| D2 | = | x^11*P1+x*P2+x^6*P3+x^12*D1+x*D3+D4 |
| D5 | = | x^6*P1+x^12*P2+x^4*P3+x^13*D1+x^9*D3+D4 |

FIG. 12D $$\begin{array}{ccc} \text{FIRST MATRIX} & \text{SECOND MATRIX} & \text{INVERSE MATRIX} \\ \begin{pmatrix} 1 & 1 \\ x^1 & x^4 \end{pmatrix} \Rightarrow & \begin{pmatrix} 1 & 1 \\ 2 & 3 \end{pmatrix} \Rightarrow & \begin{pmatrix} 3 & 1 \\ 2 & 1 \end{pmatrix} \end{array}$$

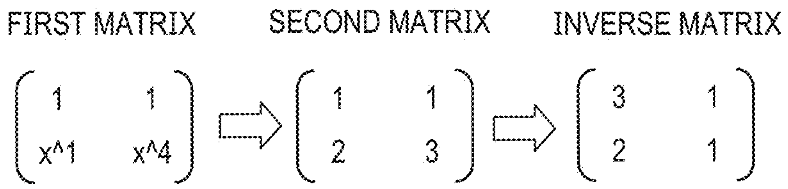

FIG. 13A $$\begin{pmatrix} 1 & 1 \\ x^1 & x^4 \end{pmatrix} \otimes \begin{pmatrix} D1 \\ D4 \end{pmatrix} = \begin{pmatrix} P1+D0+D2+D3+D5 \\ P2+D0+D2*x^2+D3*x^3+D5*x^5 \end{pmatrix}$$

$$\Downarrow$$

$$\begin{pmatrix} D1 \\ D4 \end{pmatrix} = \begin{pmatrix} 3 & 1 \\ 2 & 1 \end{pmatrix} \otimes \begin{pmatrix} P1+D0+D2+D3+D5 \\ P2+D0+D2*x^2+D3*x^3+D5*x^5 \end{pmatrix}$$

$$\Downarrow$$

$$\begin{pmatrix} D1 \\ D4 \end{pmatrix} = \begin{pmatrix} 3 & 1 \\ 2 & 1 \end{pmatrix} \otimes \begin{pmatrix} P1+D0+D2+D3+D5 \\ P2+D0+D2*4+D3*8+D5*6 \end{pmatrix}$$

$$\Downarrow$$

| D1 | = | 3*P1+P2+2*D0+7*D2+11*D3+5*D5 |
|---|---|---|
| D4 | = | 2*P1+P2+3*D0+6*D2+10*D3+4*D5 |

$$\Downarrow$$

| D1 | = | x^4*P1+P2+x*D0+x^10*D2+x^7*D3+x^8*D5 |
|---|---|---|
| D4 | = | x*P1+P2+x^4*D0+x^5*D2+x^9*D3+x^2*D5 |

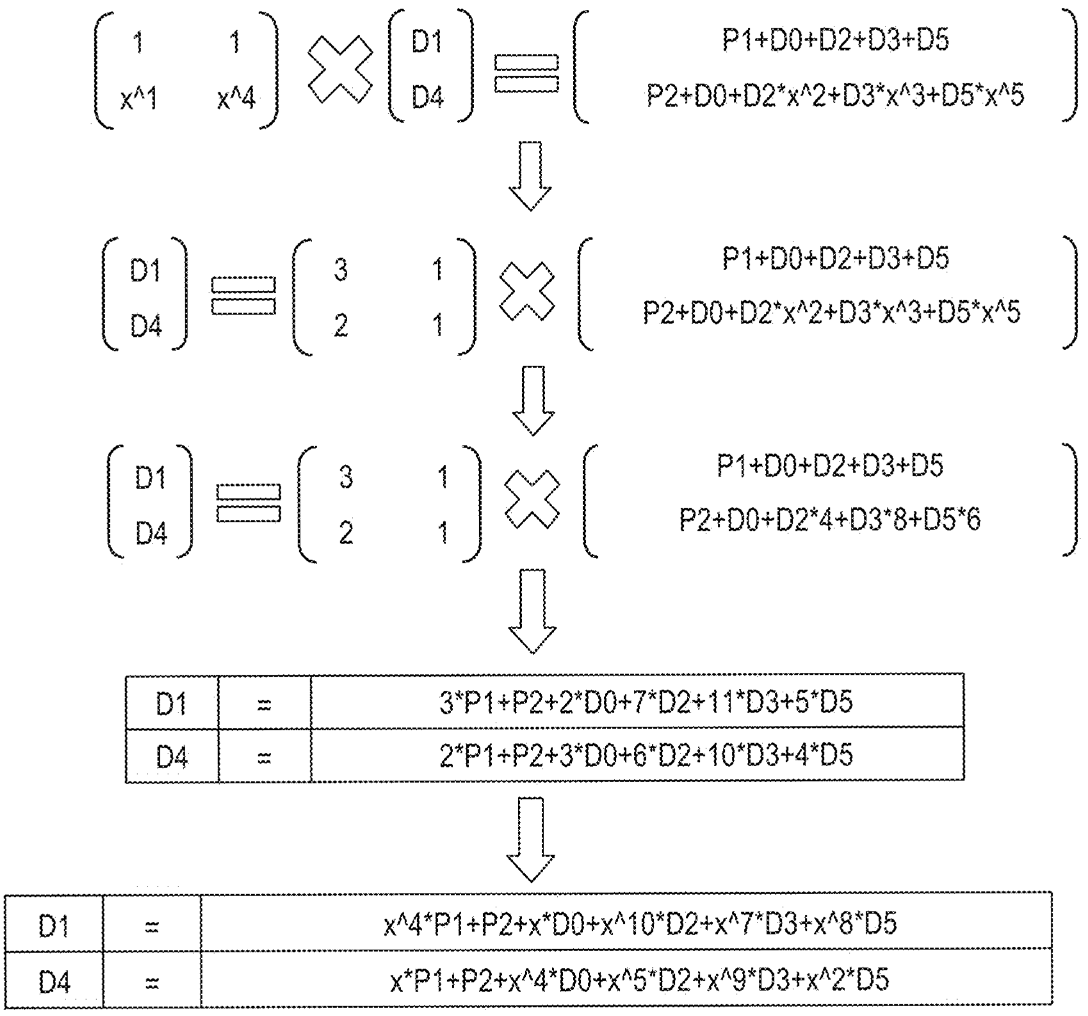

FIG. 13B

COMPRESS A FIRST MAPPING TABLE TO OBTAIN A SECOND MAPPING TABLE, WHEREIN THE FIRST MAPPING TABLE COMPRISES A CORRESPONDENCE RELATION BETWEEN AN EXPONENT PORTION OF EACH ELEMENT OF ALL ELEMENTS CORRESPONDING TO AN ERROR CORRECTION CODING EQUATION AND AN EQUATION COEFFICIENT, AND THE EXPONENT PORTIONS OF ALL THE ELEMENTS ARE A GROUP OF CONTINUOUS DATA; AND THE SECOND MAPPING TABLE COMPRISES A CORRESPONDENCE RELATION BETWEEN THE EXPONENT PORTIONS OF PART OF ALL THE ELEMENTS AND THE EQUATION COEFFICIENTS, AND THE EXPONENT PORTIONS OF THE PART OF THE ELEMENTS COMPRISE A PLURALITY OF PIECES OF NODE DATA EXTRACTED FROM THE CONTINUOUS DATA — S101

ACQUIRE THE EQUATION COEFFICIENT CORRESPONDING TO THE EXPONENT PORTION OF ANY ELEMENT OF ALL THE ELEMENTS USING THE NODE DATA IN THE SECOND MAPPING TABLE THROUGH A SEGMENTED QUERY — S102

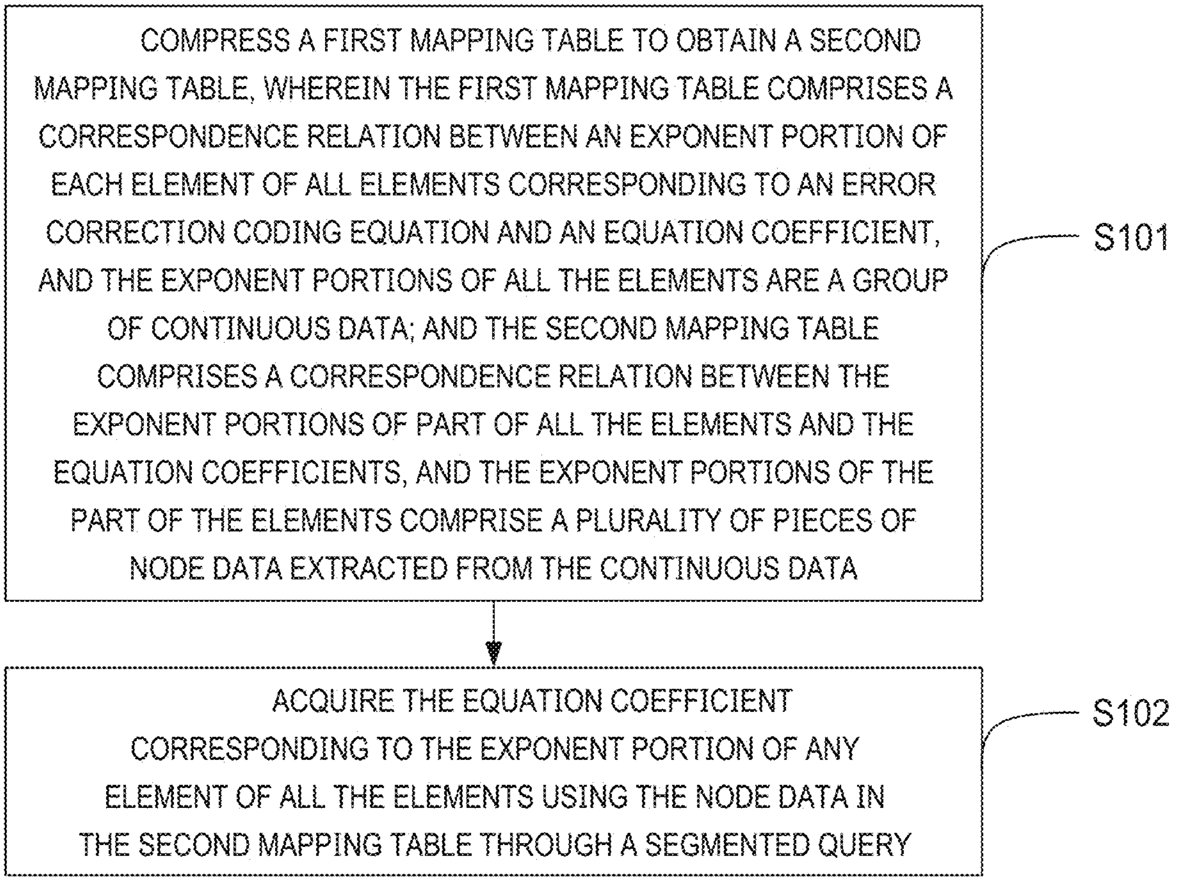

FIG.14

MEMORY SYSTEM AND OPERATION METHOD THEREOF AND MEMORY CONTROLLER

CROSS-REFERENCE TO RELATED APPLICATIONS

The present application claims priority to Chinese Patent Application No. 2023112553052, which was filed Sep. 26, 2023, is titled "A METHOD OF OPERATING A MEMORY, A MEMORY AND A MEMORY SYSTEM," and is hereby incorporated herein by reference in its entirety.

TECHNICAL FIELD

Examples of the present disclosure relate to the technical field of semiconductors, and particularly to a memory system and an operation method thereof and a readable storage medium.

BACKGROUND

A memory device is a storage apparatus used to save information in a modern information technique. As a typical non-volatile semiconductor memory, an NAND memory gradually becomes a mainstream product in the memory market due to a higher storage density, controllable production cost, a suitable erase speed and a retention characteristic. With the increasingly high requirements for the storage apparatus, there is still much room for improvements in the memory device and a system thereof.

SUMMARY

According to some aspects of an example of the present disclosure, a memory system is provided, which comprises: a memory device; a memory controller coupled with the memory device and configured to: compress a first mapping table, to obtain a second mapping table, wherein the first mapping table comprises a correspondence relation between an exponent portion of each element of elements corresponding to an error correction coding equation and an equation coefficient, the exponent portions of the elements are a group of continuous data; the second mapping table comprises a correspondence relation between the exponent portions of part of the elements and the equation coefficients, and the exponent portions of the part of the elements comprise node data in the continuous data; and obtain the equation coefficient corresponding to the exponent portion of any element of the elements based on the node data in the second mapping table and a segmented query.

In some examples, the elements and the corresponding equation coefficients are finite domains; the memory controller is configured to: generate the elements corresponding to the error correction coding equation; generate the first mapping table according to the elements; group the exponent portion of each element of the elements in the first mapping table and the corresponding equation coefficients, and select the exponent portion of a fixed element in each group as the node data; and obtain the second mapping table based on the node data and the equation coefficient corresponding to the node data.

In some examples, a total number of the elements included in each group is substantially the same, the exponent portions of the elements in each group are a group of continuous data, and the exponent portion of the fixed element in each group is a first data of the continuous data in each group.

In some examples, the memory controller is further configured to: obtain an error correction decoding inverse matrix by the node data in the second mapping table and a corresponding bias calculation in response to an error occurring in reading the storage data in the memory device; and perform an error correction based on the error correction decoding inverse matrix.

In some examples, the memory controller is configured to: obtain a plurality of elements corresponding to the storage data with the error in response to the error occurring in reading the storage data in the memory device; obtain a first matrix based on elements corresponding to the storage data with the error; obtain a second matrix based on the equation coefficient corresponding to the exponent portion of each element in the first matrix; and calculate an inverse matrix of the second matrix, to obtain the error correction decoding inverse matrix.

In some examples, the memory controller is configured to: determine a group in which the exponent portion of each element in the first matrix falls and a deviation value of the exponent portion of each element in the first matrix from the exponent portion of the respective fixed element falling in the group; obtain the equation coefficient corresponding to the exponent portion of the respective fixed element falling in the group by querying the second mapping table; and calculate the equation coefficient corresponding to the exponent portion of the respective element based on the obtained equation coefficient and the deviation value.

In some examples, the memory controller further comprises a coding circuit which is configured to: generate a corresponding equation coefficient matrix according to the elements; generate a coding matrix using the equation coefficient matrix; and perform a coding operation on storage data to be written to the memory device using the coding matrix, to obtain check data corresponding to the storage data.

In some examples, the memory controller further comprises a decoding circuit which is configured to: perform a decoding operation based on the error correction decoding inverse matrix, a remaining storage data without the error and a check data corresponding to the storage data, to obtain recovered storage data.

In some examples, at least one of the coding circuit or the decoding circuit comprises a Linear Feedback Shift Register (LFSR) circuit.

In some examples, the memory controller is further configured to: perform a read operation on the storage data in the memory device; in response to an error occurring to the read storage data, perform read retry processing on the storage data with the error; in response to an error occurring to the storage data after performing the read retry processing, perform soft decoding processing on the storage data with the error; and in response to an error occurring to the storage data after performing the soft decoding processing, perform an error correction through the error correction decoding inverse matrix.

In some examples, the second mapping table is stored in the memory device or a Read-Only Memory (ROM) of the memory controller.

According to some aspects of an example of the present disclosure, a method of operating a memory system is provided, which comprises: compressing a first mapping table, to obtain a second mapping table, wherein the first mapping table comprises a correspondence relation between an exponent portion of each element of elements corresponding to an error correction coding equation and an equation coefficient, the exponent portions of the elements are a group of continuous data; the second mapping table comprises a correspondence relation between the exponent portions of part of the elements and the equation coefficients, and the exponent portions of the part of the elements comprise node data in the continuous data; and obtaining the equation coefficient corresponding to the exponent portion of any element of the elements using the node data in the second mapping table and a segmented query.

In some examples, the elements and the corresponding equation coefficients are finite domains, and the method further comprises: generating the elements corresponding to the error correction coding equation; generating the first mapping table according to the elements; during a process of compressing the first mapping table, grouping the exponent portion of each element of the elements in the first mapping table and the corresponding equation coefficient, and selecting an exponent of a fixed element in each group as node data; and obtaining the second mapping table based on the node data and the corresponding equation coefficient.

In some examples, a total number of the elements included in each group is substantially the same, the exponent portions of the elements included in each group are a group of continuous data, and the exponent portion of the fixed element in each group is a first piece of data of the continuous data in each group.

In some examples, the method further comprises: obtaining an error correction decoding inverse matrix by querying the node data in the second mapping table and a corresponding bias in response to an error occurring in reading the storage data in the memory device; and performing an error correction based on the error correction decoding inverse matrix.

In some examples, the obtaining the error correction decoding inverse matrix by the node data in the second mapping table and the corresponding bias comprises: obtaining a plurality of elements corresponding to the storage data with the error in response to the error occurring in reading the storage data in the memory device; obtaining a first matrix based on a plurality of elements corresponding to the storage data with the error; obtaining a second matrix based on the equation coefficient corresponding to the exponent portion of each element in the first matrix; and calculating an inverse matrix of the second matrix, to obtain the error correction decoding inverse matrix.

In some examples, the acquiring the equation coefficient corresponding to the exponent portion of each element in the first matrix comprises: for the exponent portion of each element in the first matrix, determining a group in which the exponent portion of the respective element falls and a deviation value of the exponent portion of the respective element from the exponent portion of the respective fixed element falling in the group; obtaining the equation coefficient corresponding to a power exponent of the respective fixed element falling in the group by querying the second mapping table; and calculating the equation coefficient corresponding to the exponent portion of the respective element based on the obtained equation coefficient and the deviation value.

In some examples, the method further comprises: generating a corresponding equation coefficient matrix according to the elements; generating a coding matrix based on the equation coefficient matrix; and performing a coding operation on storage data to be written to the memory device based on the coding matrix, to obtain check data corresponding to the storage data.

In some examples, the performing the error correction based on the error correction decoding inverse matrix comprises: perform a decoding operation based on the error correction decoding inverse matrix, the remaining storage data without the error and the check data corresponding to the storage data, to obtain recovered storage data.

In some examples, the method further comprises: performing a read operation on the storage data in the memory device; in response to an error occurring to the read storage data, performing read retry processing on the storage data with the error; in response to an error occurring to the storage data after performing the read retry processing, performing soft decoding processing on the storage data still with the error; and in response to an error occurring to the storage data after performing the soft decoding processing, performing an error correction through the error correction decoding inverse matrix.

According to some aspects of an example of the present disclosure, a memory controller is provided, which the memory controller comprises a control portion and an interface, and the control portion is configured to: compress a first mapping table to obtain a second mapping table, wherein the first mapping table comprises a correspondence relation between an exponent portion of each element of elements corresponding to an error correction coding equation and an equation coefficient, and the exponent portions of the elements are a group of continuous data; and the second mapping table comprises a correspondence relation between the exponent portions of part of the elements and the equation coefficients, and the exponent portions of the part of the elements comprise node data in the continuous data; and acquire the equation coefficient corresponding to the exponent portion of any element of the elements based on the node data in the second mapping table through a segmented query.

According to some aspects of an example of the present disclosure, a readable storage medium is provided. The readable storage medium stores a computer program which, in response to being executed, implements the operation method.

According to the examples of the present disclosure, the first mapping table is compressed to generate the second mapping table; the second mapping table comprises the correspondence relation between the exponent portions of part of the elements and the equation coefficient, the exponent portions of the part or the elements are the plurality of pieces of node data extracted from the continuous data; and the equation coefficient corresponding to the exponent portion of any element of the elements is acquired based on the node data in the second mapping table through the segmented query. Thus, the second mapping table may implement the obtaining of any equation coefficient; and meanwhile, a data size included in the second mapping table is less than that of the first mapping table, and storing the second mapping table may reduce the occupation of the storage capacity by the mapping table.

BRIEF DESCRIPTION OF THE DRAWINGS

FIG. 8A to FIG. 8D are schematic diagrams about equation coefficients according to an example of the present disclosure.

FIG. 9 is a schematic diagram of a mapping table according to an example of the present disclosure.

FIG. 10A is a schematic diagram of a first mapping table according to an example of the present disclosure.

FIG. 10B is a schematic diagram of a second mapping table according to an example of the present disclosure.

FIG. 12A to FIG. 12D are schematic diagrams of decoding using an inverse matrix according to an example of the present disclosure.

FIG. 13A to FIG. 13B are another schematic diagram of decoding using an inverse matrix according to an example of the present disclosure.

FIG. 14 is a schematic diagram of an operation method of a memory system according to an example of the present disclosure.

Figure 1:
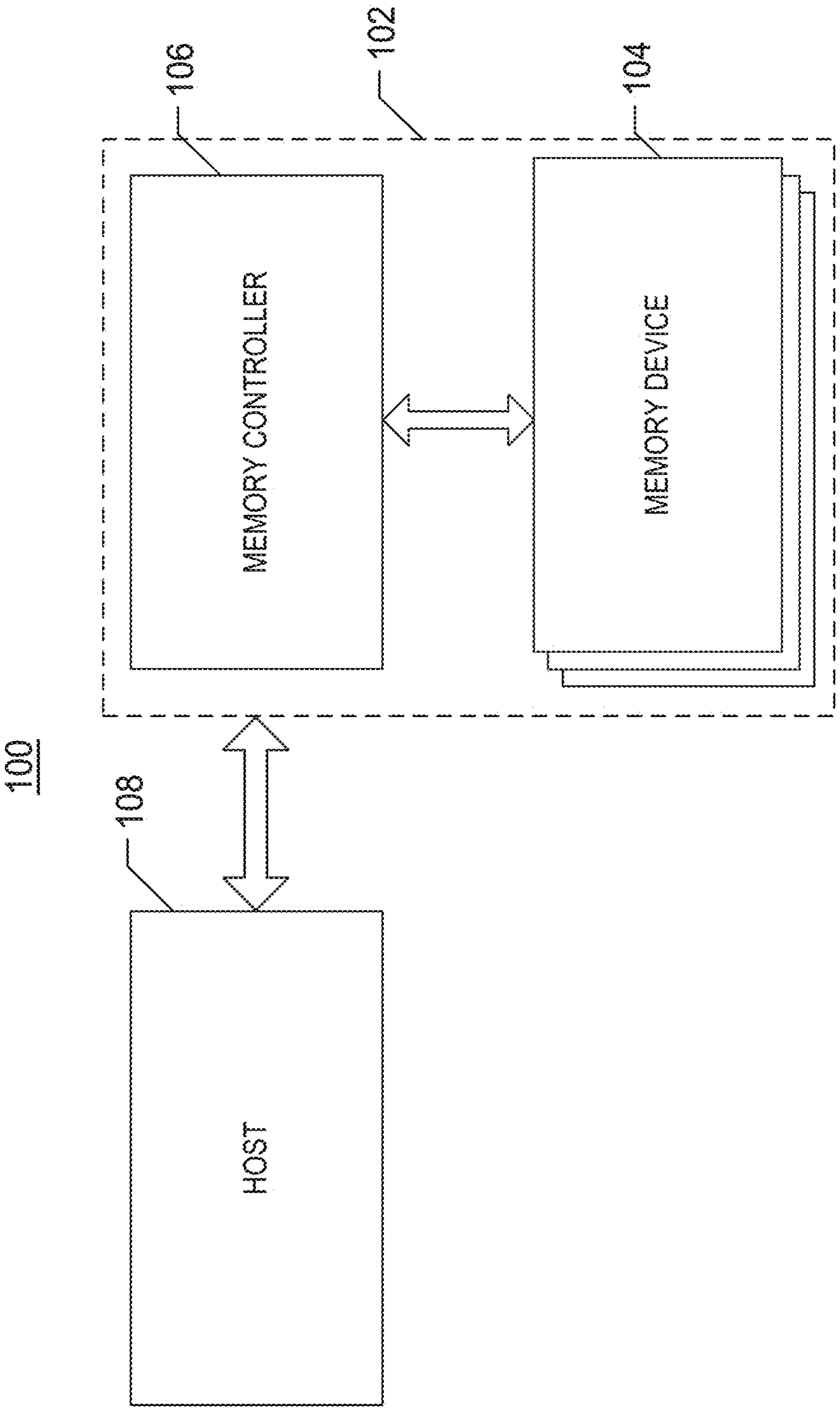
FIG. 1 is a schematic diagram of an example system having a memory system according to an example of the present disclosure.

In the above drawings (not necessarily drawn to scale), like reference numerals may describe like components in different views. Like reference numerals having different letter suffixes may represent different examples of like components. The drawings illustrate generally, by way of example, but not by way of limitation, each example as discussed herein.

DETAILED DESCRIPTION

The technical solutions in implementations of the present disclosure will be described below clearly and completely in conjunction with the implementations and the drawings of the present disclosure. Apparently, the implementations described are only part, but not all, of the implementations of the present disclosure. All other implementations obtained by those of ordinary skill in the art based on the implementations in the present disclosure without creative work shall fall in the scope of protection of the present disclosure.

The terms used herein are only intended to describe the specific examples, and are not used as limitations of the present disclosure. As used herein, unless otherwise indicated expressly in the context, “a”, “an” and “the” in a singular form are also intended to include a plural form. It should also be understood that the terms “consist of” and/or “comprise”, when used in this specification, determine the presence of a feature, integer, step, operation, element and/or component, but do not preclude the presence or addition of one or more of other features, integers, steps, operations, elements, components, and/or groups. As used herein, the term “and/or” includes any and all combinations of the listed relevant items.

In order to enable the understanding of the characteristics and the technical contents of the examples of the present disclosure in more detail, implementation of the examples of the present disclosure is set forth in detail below in conjunction with the drawings, and the appended drawings are only used for reference and illustration, instead of being used to limit the examples of the present disclosure.

It should be understood that, references to “one example” or “an example” throughout this specification mean that particular features, structures, or characteristics related to the example are included in at least one example of the present disclosure. Therefore, “in one example” or “in an example” presented throughout this specification does not necessarily refer to the same example. Furthermore, these particular features, structures, or characteristics may be incorporated in one or more examples in any suitable manner. It is to be understood that, in various examples of the present disclosure, sequence numbers of the above processes do not indicate an execution sequence, and an execution sequence of various processes shall be determined by functionalities and intrinsic logics thereof, and shall constitute no limitation on an implementation process of the examples of the present disclosure. The above sequence numbers of the examples of the present disclosure are only for description, and do not represent advantages or disadvantages of the examples.

The methods disclosed in several method examples as provided by the present disclosure may be combined freely to obtain new method examples in case of no conflicts.

The memory device in the examples of the present disclosure includes, but is not limited to, a three-dimensional NAND memory. For ease of understanding, the illustration is made by taking the three-dimensional NAND memory as an example.

FIG. 1 illustrates a block diagram of an example system 100 having a memory device according to some aspects of the present disclosure. The system 100 may be a mobile phone, a desktop computer, a laptop computer, a tablet computer, a vehicle computer, a gaming console, a printer, a positioning apparatus, a wearable electronic apparatus, a smart sensor, a virtual reality (VR) apparatus, an augmented reality (AR) apparatus, or any other suitable electronic apparatuses having storage therein. As shown in FIG. 1, the system 100 may comprise a host 108 and a memory system 102, wherein the memory system 102 has one or more memory devices 104 and a memory controller 106. The host 108 may be a processor (e.g., a central processing unit (CPU)) or a system on chip (SOC) (e.g., an application processor (AP)) of an electronic apparatus. The host 108 may be configured to send or receive data to or from the memory devices 104.

According to some implementations, the memory controller 106 is coupled to the memory devices 104 and the host 108, and configured to control the memory devices 104. The memory controller 106 can manage the data stored in the memory devices 104 and communicate with the host 108. In some implementations, the memory controller 106 is designed for operating in a low duty-cycle environment such as Secure Digital (SD) cards, Compact Flash (CF) cards, Universal Serial Bus (USB) flash drives, or other media for use in electronic apparatuses, such as personal computers, digital cameras, mobile phones, etc. In some implementations, the memory controller 106 is designed for operating in high duty-cycle environment SSDs or embedded Multi-Media Cards (eMMCs) used as data storage for mobile apparatuses, such as smartphones, tablet computers, laptop computers, etc., and enterprise memory arrays.

The memory controller 106 may be configured to control operations of the memory devices 104, such as read, erase, and program operations. The memory controller 106 may be further configured to manage various functions with respect to data stored or to be stored in the memory devices 104, including, but not limited to, bad-block management, garbage collection, logical-to-physical address conversion, wear leveling, etc. In some implementations, the memory controller 106 is further configured to process error correction codes (ECCs) with respect to the data read from or written to the memory devices 104. The memory controller 106 may further perform any other suitable functions as well, for example, formatting the memory devices 104. The memory controller 106 may communicate with an external apparatus (e.g., the host 108) according to a particular communication protocol. For example, the memory controller 106 may communicate with the external apparatus through at least one of various interface protocols, such as a USB protocol, a MMC protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer Small Interface (SCSI) protocol, an Enhanced Small Disk Interface (ESDI) protocol, an Integrated Drive Electronics (IDE) protocol, a Firewire protocol, etc.

Figure 2B:
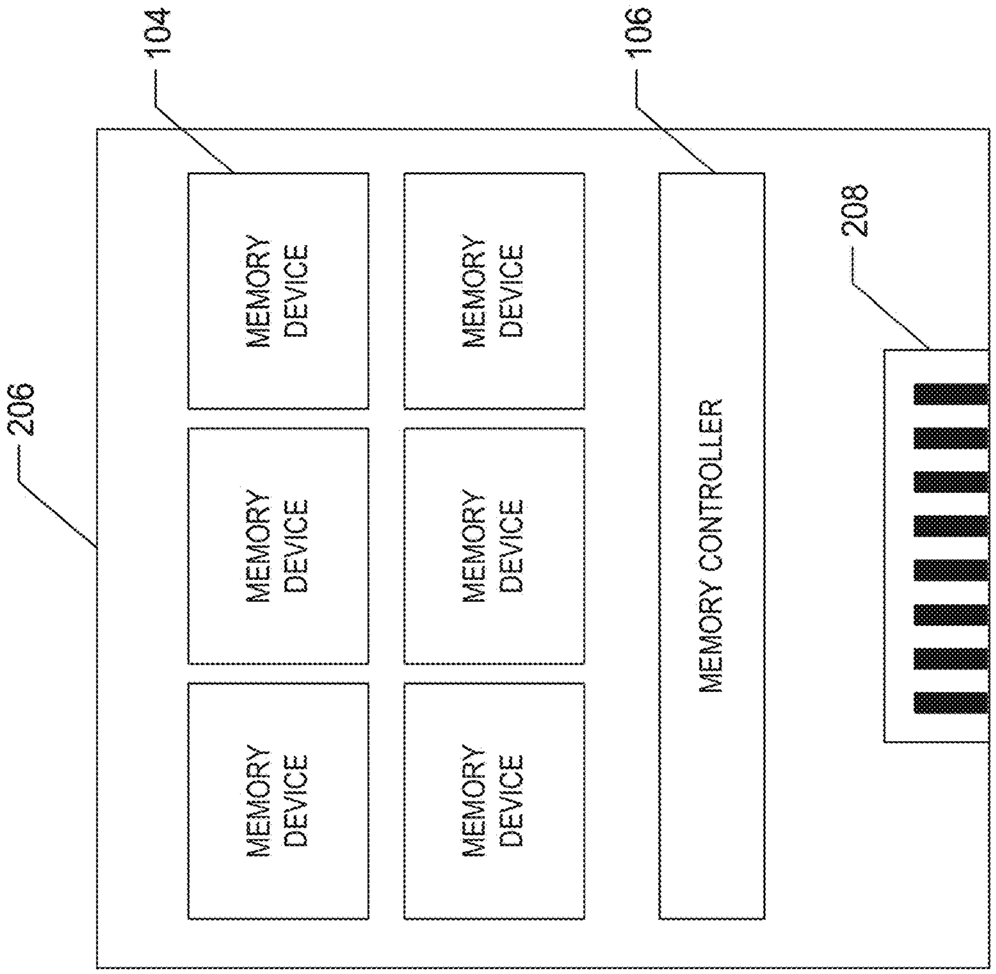
FIG. 2B is a schematic diagram of an example solid-state drive having a memory system according to an example of the present disclosure.
Figure 2A:
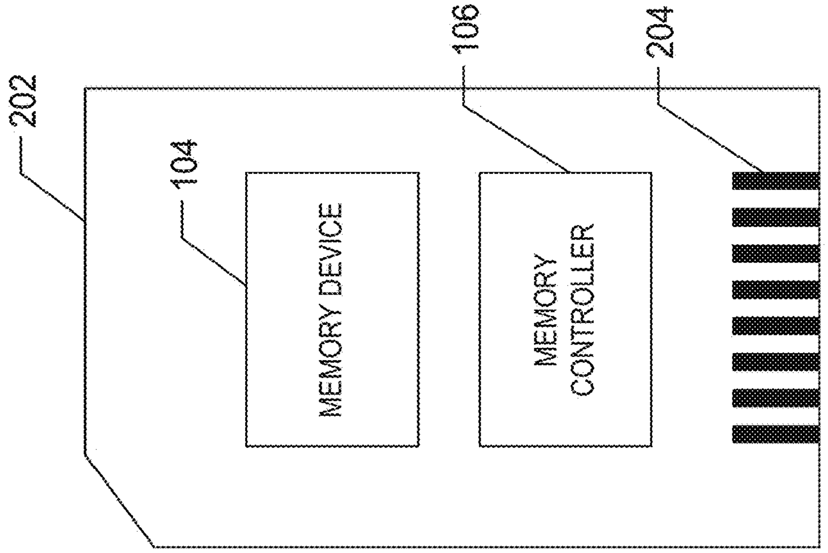
FIG. 2A is a schematic diagram of an example memory card having a memory system according to an example of the present disclosure.

The memory controller 106 and the one or more memory devices 104 can be integrated into various types of storage apparatuses, for example, be included in the same package, such as a Universal Flash Storage (UFS) package or an eMMC package. That is to say, the memory system 102 can be implemented and packaged into different types of end electronic products. In one example as shown in FIG. 2A, the memory controller 106 and a single memory device 104 may be integrated into a memory card 202. The memory card 202 may include a PC card (PCMCIA, Personal Computer Memory Card International Association), a CF card, a Smart Media (SM) card, a memory stick, a Multimedia card (MMC, RS-MMC, MMCmicro), an SD card (SD, miniSD, microSD, SDHC), a UFS, etc. The memory card 202 may further comprise a memory card connector 204 coupling the memory card 202 with a host (e.g., the host 108 in FIG. 1). In another example as shown in FIG. 2B, the memory controller 106 and multiple memory devices 104 may be integrated into an SSD 206. The SSD 206 may further comprise an SSD connector 208 coupling the SSD 206 with a host (e.g., the host 108 in FIG. 1). In some implementations, at least one of a storage capacity or an operation speed of the SSD 206 is greater than at least one of a storage capacity or an operation speed of the memory card 202.

Figure 3:
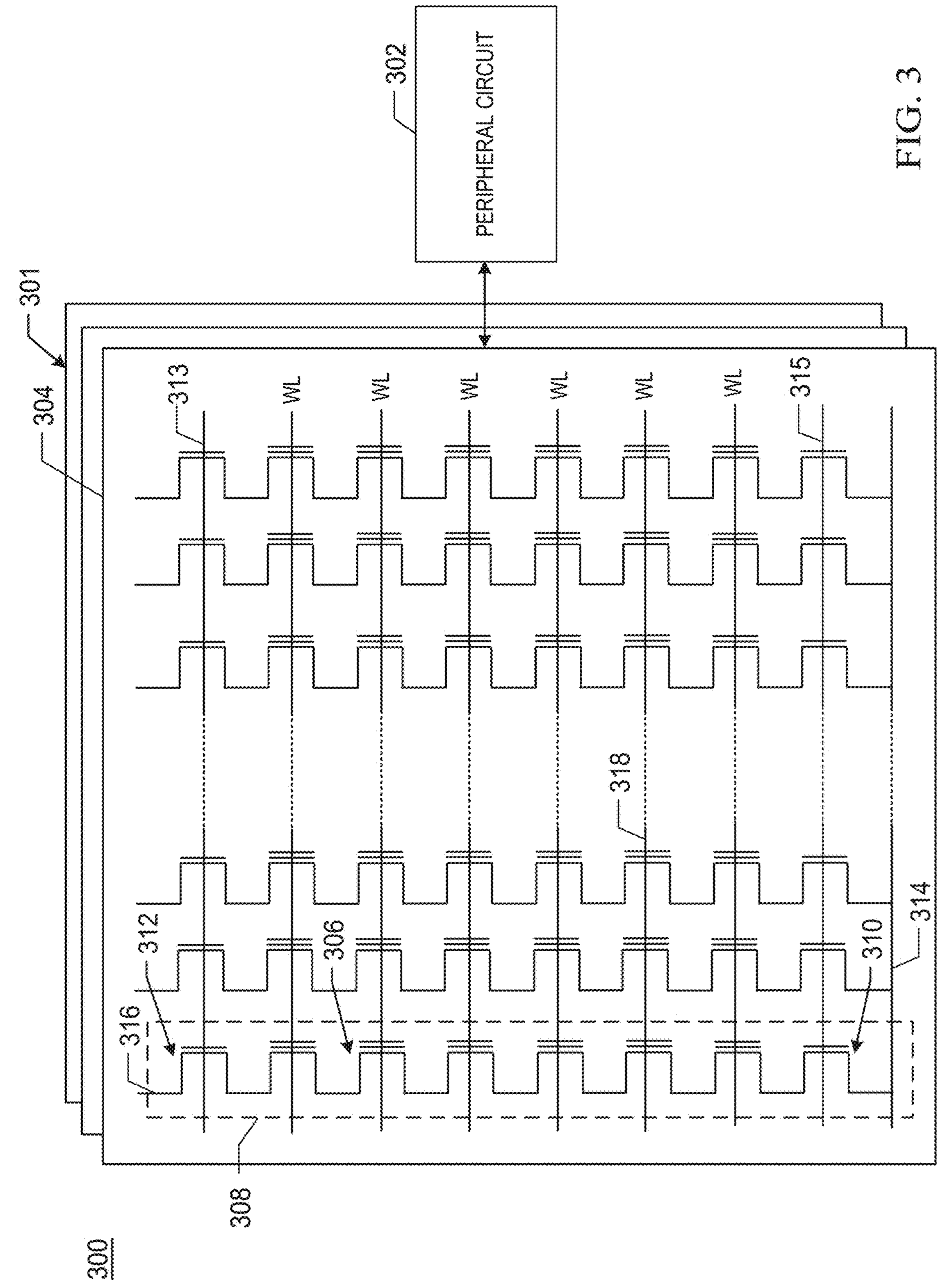
FIG. 3 is a schematic diagram of an example memory device including a peripheral circuit according to an example of the present disclosure.

FIG. 3 illustrates a schematic circuit diagram of an example memory device 300 comprising a peripheral circuit according to some aspects of the present disclosure. The memory device 300 may be an example of the memory devices 104 in FIG. 1. The memory device 300 may comprise a memory cell array 301 and a peripheral circuits 302 coupled to the memory cell array 301. An illustration is made by taking the memory cell array 301 being a three-dimensional NAND memory cell array as an example, wherein memory cells 306 are provided in an array of NAND memory strings 308, and each NAND memory string 308 extends vertically above a substrate (not shown). In some implementations, each NAND memory string 308 comprises a plurality of memory cells 306 that are coupled in series and stacked vertically. Each memory cell 306 can hold a continuous, analog value, such as an electrical voltage or charge, that depends on a number of electrons trapped within a region of the memory cell 306. Each memory cell 306 may be either a “floating gate” type memory cell that includes a floating gate transistor, or a “charge trap” type memory cell that includes a charge trap transistor.

In some implementations, each memory cell 306 is a single-level cell (SLC) that has two possible memory states and thus can store one bit of data. For example, the first memory state “O” may correspond to a first range of voltage, and the second memory state “1” may correspond to a second range of voltage. In some implementations, each memory cell 306 is a multi-level cell (MLC) that is capable of storing more than a single bit of data in more than four memory states. For example, the MLC can store two bits per cell, three bits per cell (also known as a triple-level cell (TLC)), or four bits per cell (also known as a quad-level cell (QLC)). Each MLC can be programmed to assume a range of possible nominal storage values. In one example, if each MLC stores two bits of data, the MLC can be programmed to write one of three possible nominal storage values to the cell, while a fourth nominal storage value other than the three nominal storage values may be used to represent the erasing state.

As shown in FIG. 3, each NAND memory string 308 may comprise a bottom select gate (BSG) 310 at its source terminal and a top select gate (TSG) 312 at its drain terminal. BSG 310 and TSG 312 may be configured to activate the selected NAND memory string 308 during read and program operations. In some implementations, sources of the NAND memory strings 308 in a same memory block 304 are coupled through a same source line (SL) 314 (e.g., a common SL). In other words, according to some implementations, all the NAND memory strings 308 in the same memory block 304 have an array common source (ACS). According to some implementations, the TSG 312 of each NAND memory string 308 is coupled to a respective bit line (BL) 316 which the data can be read from or written to via an output bus (not shown). In some implementations, each NAND memory string 308 is configured to be selected or unselected by applying a select voltage (e.g., above a threshold voltage of a transistor having the TSG 312) or an unselect voltage (e.g., 0 V) to the respective TSG 312 via one or more TSG lines 313 and/or by applying a select voltage (e.g., above a threshold voltage of a transistor having the BSG 310) or an unselect voltage (e.g., 0 V) to the respective BSG 310 via one or more BSG lines 315.

As shown in FIG. 3, the NAND memory strings 308 can be organized into multiple memory blocks 304, each of which may have a common source line 314, e.g., coupled to the ground. In some implementations, each memory block 304 is a basic data unit for the erase operation, i.e., all of the memory cells 306 on the same memory block 304 are erased at the same time. In order to erase the memory cells 306 in a selected memory block 304*a*, the source lines 314 coupled to the selected memory block 304*a* as well as unselected memory blocks 304*b* that are in the same plane as the selected memory block 304*a* can be biased with an erase voltage (Vers), such as a high positive voltage (e.g., 20 V or higher). It is to be understood that in some examples, an erase operation may be performed at a half memory block level, a quarter memory block level, or a level having any suitable number of memory blocks or any suitable fractions of a memory block. The memory cells 306 of adjacent ones of the NAND memory strings 308 may be coupled through word lines 318 that select which row of memory cells 306 is affected by the read and program operations.

Figure 4:
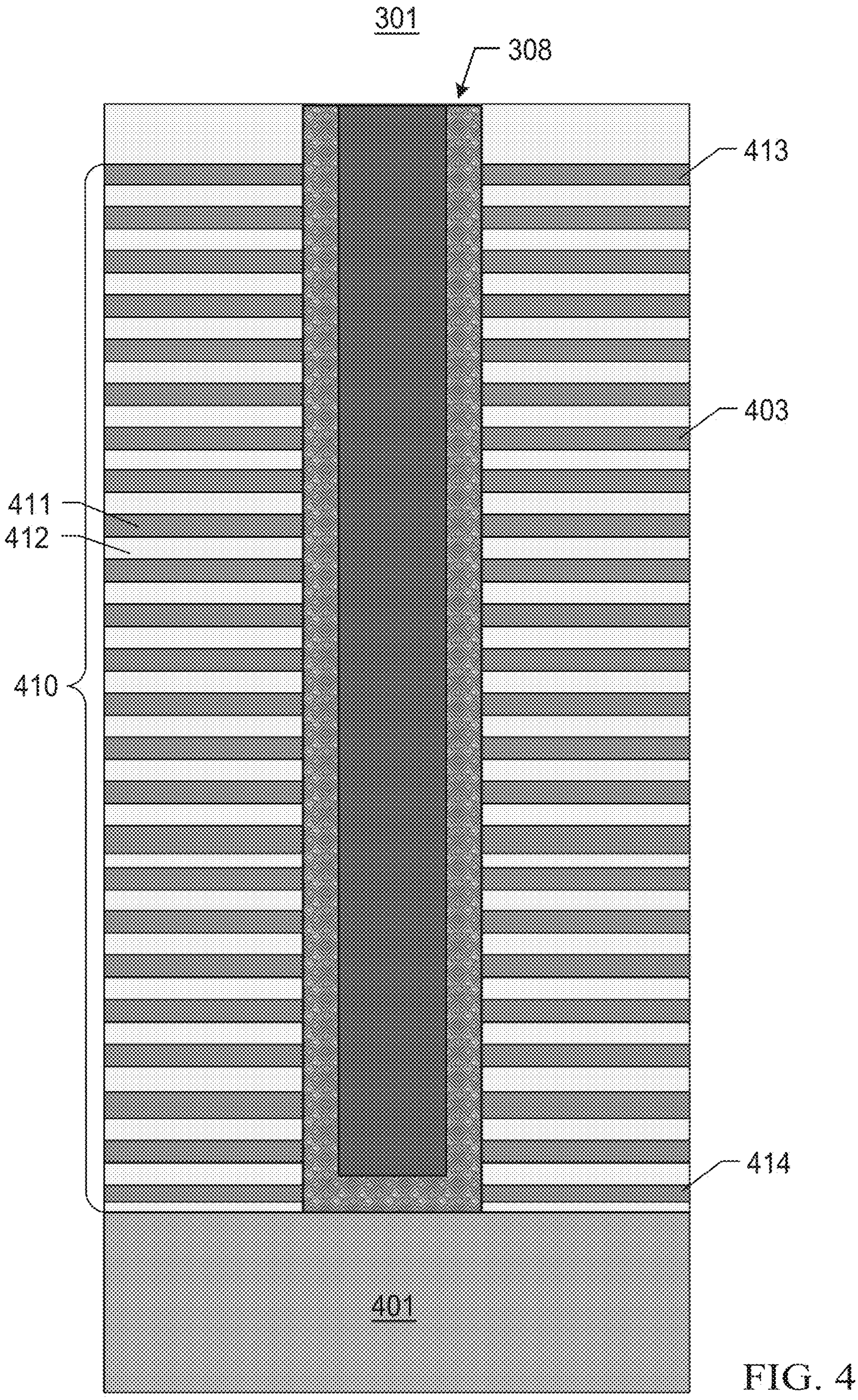
FIG. 4 is a schematic cross-sectional view of a memory cell array including an NAND memory string according to an example of the present disclosure.

FIG. 4 illustrates a schematic cross-sectional view of an example memory cell array 301 comprising a NAND memory string 308 according to some aspects of the present disclosure. As shown in FIG. 4, the NAND memory string 308 may comprise a stack structure 410 which comprises a plurality of gate layers 411 and a plurality of insulation layers 412 that are disposed in a stack alternately and sequentially, and a memory string 308 penetrating through the gate layers 411 and the insulation layers 412 vertically. The gate layers 411 and the insulation layers 412 may be stacked alternately, and two adjacent ones of the gate layers 411 are separated by one insulation layer 412. A number of pairs of the gate layers 411 and the insulation layers 412 in the stack structure 410 may determine a number of memory cells that are included in the memory cell array 301.

A constituent material of the gate layers 411 may include a conductive material. The conductive material includes, but is not limited to, tungsten (W), cobalt (Co), copper (Cu), aluminum (Al), polysilicon, doped silicon, silicides, or any combination thereof. In some implementations, each gate layer 411 comprises a metal layer, e.g., a tungsten layer. In some implementations, each gate layer 411 comprises a doped polysilicon layer. Each gate layer 411 may comprise a control gate around the memory cells. The gate layer 411 at the top of the stack structure 410 may extend laterally as an upper select gate line; the gate layer 411 at the bottom of the stack structure 410 may extend laterally as a lower select gate line; and the gate layers 411 that extend laterally between the upper select gate line and the lower select gate line may act as word line layers.

In some examples, the stack structure 410 may be disposed on a substrate 401. The substrate 401 may include silicon (e.g., single crystalline silicon), silicon germanium (SiGe), gallium arsenide (GaAs), germanium (Ge), silicon on insulator (SOI), germanium on insulator (GOI), or any other suitable materials.

In some examples, the NAND memory string 308 comprises a channel structure that extends through the stack structure 410 vertically. In some implementations, the channel structure comprises a channel hole filled with (one or more) semiconductor materials (e.g., as a semiconductor channel) and (one or more) dielectric materials (e.g., as a memory film). In some implementations, the semiconductor channel comprises silicon, e.g., polysilicon. In some implementations, the memory film is a composite dielectric layer including a tunneling layer, a storage layer (also known as a "charge trap/storage layer"), and a blocking layer. The channel structure may have a cylindrical shape (e.g., a pillar shape). According to some implementations, the semiconductor channel, the tunneling layer, the storage layer, and the blocking layer are arranged radially from the center toward the outer surface of the pillar in this order. The tunneling layer can include silicon oxide, silicon oxynitride, or any combination thereof. The storage layer can include silicon nitride, silicon oxynitride, or any combination thereof. The blocking layer can include silicon oxide, silicon oxynitride, a high dielectric constant (high-k) dielectric, or any combination thereof. In an example, the memory film can include a composite layer of silicon oxide/silicon oxynitride/silicon oxide (ONO).

Figure 5:
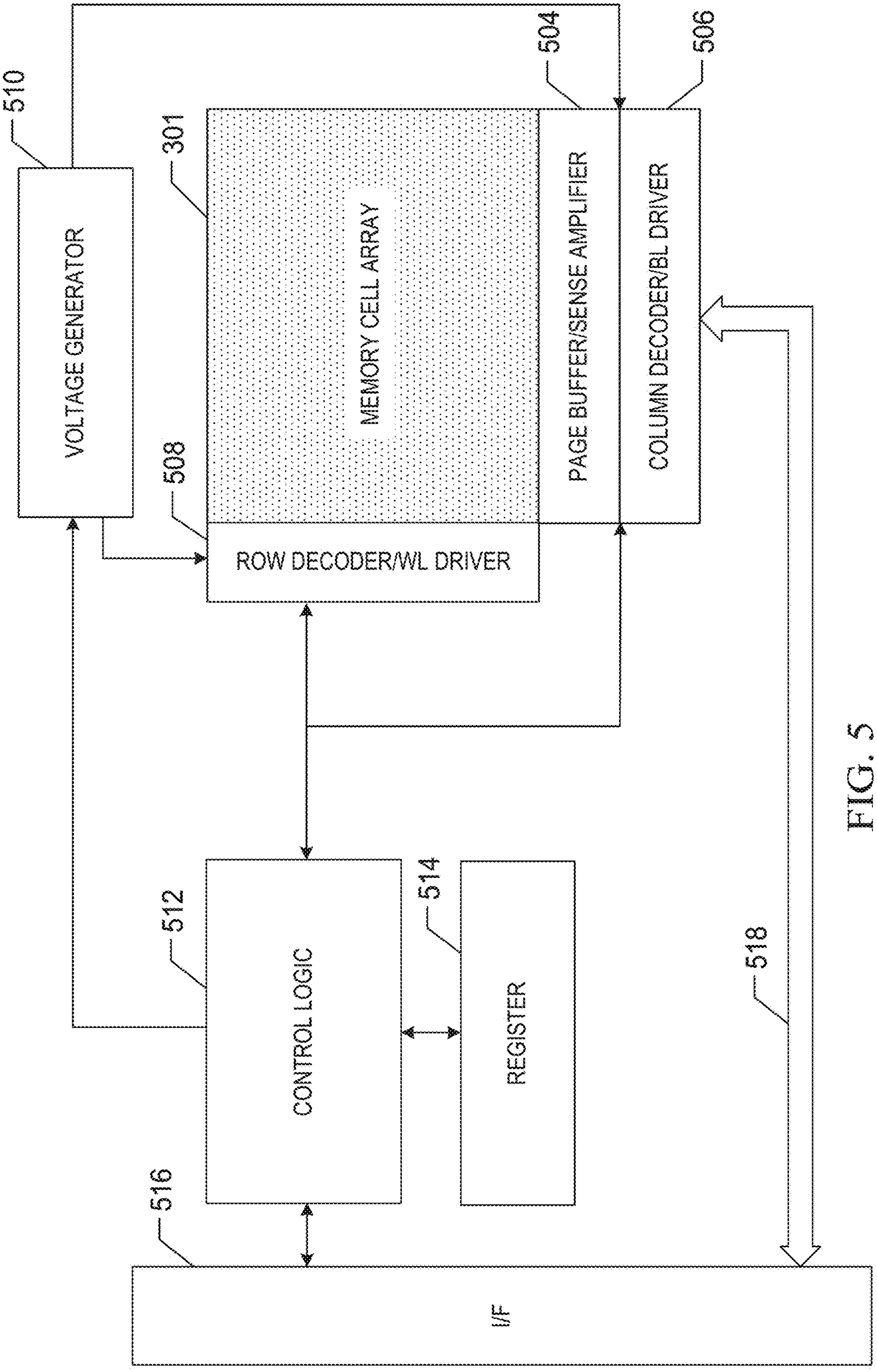
FIG. 5 is a schematic diagram of an example memory device including a memory cell array and a peripheral circuit according to an example of the present disclosure.

Referring back to FIG. 3, the peripheral circuit 302 may be coupled to the memory cell array 301 through the bit lines 316, the word lines 318, the source lines 314, the BSG lines 315 and the TSG lines 313. The peripheral circuit 302 may include any suitable analog, digital, and hybrid signal circuits for facilitating the operations of the memory cell array 301 by applying and sensing voltage signals and/or current signals to and from each target memory cell 306 via the bit lines 316, the word lines 318, the source lines 314, the BSG lines 315, and the TSG lines 313. The peripheral circuit 302 may include various types of peripheral circuits formed using a metal-oxide-semiconductor (MOS) technology. For example, FIG. 5 illustrates some example peripheral circuits. The peripheral circuit 302 comprises a page buffer/sense amplifier 504, a column decoder/bit line driver 506, a row decoder/word line driver 508, a voltage generator 510, a control logic 512, a register 514, an interface 516, and a data bus 518. It is to be understood that in some examples, additional peripheral circuits not shown in FIG. 5 may be included as well.

The page buffer/sense amplifier 504 may be configured to read and program (write) data from and to the memory cell array 301 according to control signals from the control logic 512. In one example, the page buffer/sense amplifier 504 may store program data (write data) to be programmed into the memory cell array 301. In another example, the page buffer/sense amplifier 504 may perform programming verify operations to ensure that the data has been properly programmed into the memory cells 306 that are coupled to the selected word lines 318. In yet another example, the page buffer/sense amplifier 504 may also sense low power signals from the bit lines 316 that represent data bits stored in the memory cells 306, and amplify small voltage swings to recognizable logic levels in read operations. The column decoder/bit line driver 506 may be configured to be controlled by the control logic 512 and select one or more NAND memory strings 308 by applying bit line voltages generated from the voltage generator 510.

The row decoder/word line driver 508 may be configured to be controlled by the control logic 512 and select/unselect the memory blocks 304 of the memory cell array 301 and select/unselect the word lines 318 of the memory blocks 304. The row decoder/word line driver 508 may be further configured to drive the word lines 318 using word line voltages generated from the voltage generator 510. In some implementations, the row decoder/word line driver 508 may also select/unselect and drive the BSG lines 315 and the TSG lines 313. As described in detail below, the row decoder/word line driver 508 is configured to perform a program operation on the memory cell 306 that is coupled to the selected word line(s) 318. The voltage generator 510 may be configured to be controlled by the control logic 512 and generate a word line voltage (such as, a read voltage, a program voltage, a pass voltage, a channel boost voltage, a verify voltage, etc.), a bit line voltage and a source line voltage to be supplied to the memory cell array 301.

In some particular examples, the program operation may comprise a plurality of stages; in an example, the program operation may comprise a channel pre-charge stage, a channel boost stage, a program pulse stage and a recovery stage. In the channel pre-charge stage, the voltage generator may generate a voltage required in a next stage, such as a voltage applied to each gate, the channel boost voltage, and the like. In the channel boost stage, the channel boost voltage may be applied to the selected word line. In the program pulse stage, a target voltage at each program may be applied to the selected word line. In the recovery stage, both the unselected and selected word lines may be operated, making the voltage decrease to a lower respective voltage such as Vcc and Vdd. The purpose of decreasing to the respective voltage may be achieved by one or more stepped voltage drops in the recovery stage, for example, the voltage may be decreased to an intermediate voltage first and held for a period of time at this intermediate voltage, and then is decreased to the respective voltage.

The control logic 512 may be coupled to each peripheral circuit described above and configured to control the operations of each peripheral circuit. The register 514 may be coupled to the control logic 512 and include a state register, a command register, and an address register for storing state information, command operation codes (OP codes), and command addresses for controlling the operations of each peripheral circuit. The interface 516 may be coupled to the control logic 512, and act as a control buffer to buffer and relay control commands received from a host (not shown) to the control logic 512 and state information received from the control logic 512 to the host. The interface 516 may be also coupled to the column decoder/bit line driver 506 via a data bus 518 and act as a data I/O interface and a data buffer to buffer and relay the data to the memory cell array 301, or relay or buffer the data from the memory cell array 301.

In some examples, the memory cells of the NAND memory may be divided into a single-level memory cell (a one-bit memory cell), a double-level memory cell (a two-bit memory cell), a three-level memory cell (a three-bit memory cell), a four-level memory cell (a four-bit memory cell) and a five-level memory cell (a five-bit memory cell) according to a storage density. The read operation thereof may be carried out in pages. In an example, when executing the read operation, a read voltage is applied to the word line (e.g., the selected word line) coupled by the selected page in the memory device 104, and when the read voltage reaches a threshold voltage of a plurality of memory cells coupled by the selected word line, or a number of the memory cell not reaching the threshold voltage is within an allowable range, the read operation of the entire page is finished. The memory cell may be an M-bit memory cell and has 2 memory states including the erase state, and M-bit storage data is read through a $2^M$-1 order read voltage. In an example, e.g., a first-order read voltage is between threshold voltages of the erase state and a first memory state, when the first-order read voltage is applied to the word line, the memory cell in the erase state is turned on, the memory cell in the first memory state is not turned on, and the erase state and the first memory state are distinguished and read out.

It is to be noted that during a process of performing the read operation, the memory cell not reaching the target threshold voltage is labeled as an error bit. In order to prevent the occurrence of a read error, an Error Correction Code (ECC) is introduced, all the error bits in the read operation can be corrected when a number of the error bits is less than or equal to a maximum number of failure bits which can be corrected through the error correction code, and thus the correct read of the data may be achieved.

In some examples, the host 108 sends a read command (or a read instruction, a read request) to the memory controller 106 according to a current user command requirement; the memory controller 106 transmits a read control command including a logical address-physical address mapping table and other information to the memory device 104 through an interface 516, to control the memory device 104 to perform the read operation on the memory cell corresponding to a respective physical address; the memory device 104, in turn, sends the read data to the memory controller 106 through the interface 516; and the memory controller 106 feeds the data back to the host 108 via PCIe or SATA and other interfaces. In an example, the memory controller 106 sends the read control command to the control logic of the memory device via the interface 516, and the control logic applies an related operation voltage to the selected word line or bit line according to the related physical address, so as to perform the read operation on the corresponding memory cell. A voltage generator may be controlled by the control logic to generate the related operation voltage according to the related read voltage mapping table which is decoded by the row decoder and applied to the word line of the respective address, or applied to the bit line of the respective address by the column decoder.

Figure 6:
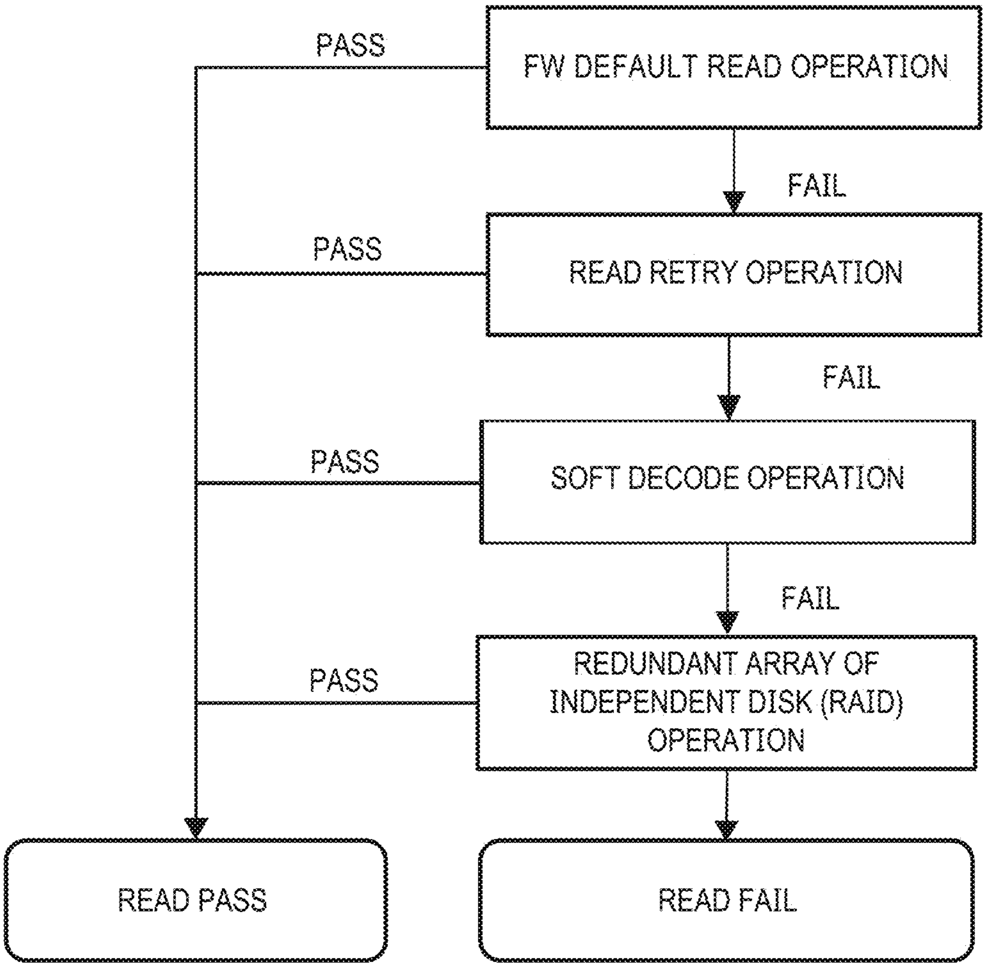
FIG. 6 is a flow diagram of a read operation including a read retry operation according to an example of the present disclosure.

In some other examples, when the memory device 104 reads the respective memory cell under the control of the memory controller 106, a read error occurs; at this time, the respective read operation of the memory controller 106 fails; the memory (or, the error correction module in the memory controller 106) is controlled; and an error correction mode may include an ECC error correction. According to some aspects of examples of the present disclosure, FIG. 6 illustrates a flow diagram of an example read operation of a memory system 102. In conjunction with what is shown in FIG. 6, when the memory controller 106 controls the memory device 104 to perform the read operation, an FW default read operation is performed on the memory cell of the respective physical address first; a read retry operation is performed after the FW default read operation fails; a soft decode operation is performed after the read retry operation fails; an Redundant Array of Independent Disks (RAID) data recovery operation is performed after the soft decode operation fails; the read operation stops after the RAID data recovery operation fails, and the read fails due to incapability of error correction; and the memory controller 106 sends a read fail signal to the host 108. The read retry operation and the FW default read operation may be applied to hard decode.

Figure 7:
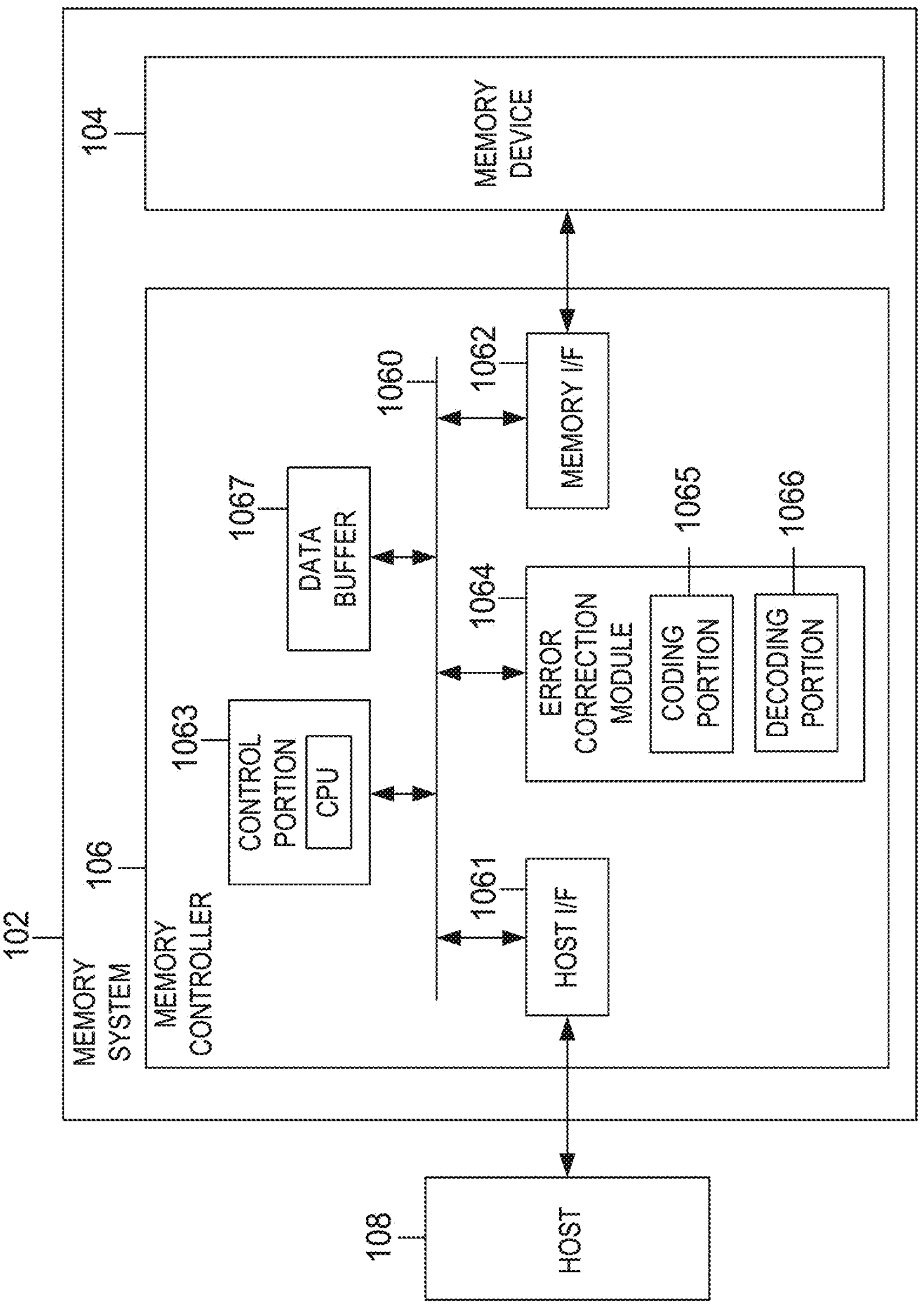
FIG. 7 is a schematic block diagram of an application of a memory controller including an error correction module in a memory system according to an example of the present disclosure.

The error correction module 1064 (e.g., the ECC module) in the memory controller 106 may control the memory device 104 to perform the read retry, soft decode, RAID and other error correction operations; the control command is sent by the memory controller 106 to the memory device 104 via the interface 516; and the memory device 104 feeds read information back to the memory controller 106 via the interface 516. It is to be noted that the performance of subsequent operations may be stopped after any one of the read retry, the soft decode and the RAID succeeds. It is to be noted that FIG. 6 only illustrates a flow example of a read operation. In some other examples, the memory controller 106 may control the memory device 104 to perform the read retry operation, the soft decode and the RAID operation in any order, and no limitation is imposed by the present disclosure on a performance order. According to some aspects of examples of the present disclosure, FIG. 7 provides a block diagram of a memory system 102 comprising a memory controller 106 comprising an error correction module 1064. Referring to what is shown in FIG. 7, the memory system 102 comprises a memory controller 106 and a memory, wherein the memory controller 106 and the memory device 104 may be coupled in any suitable way. In examples of the present disclosure, the memory controller 106 comprises a host I/F 1061, a memory I/F 1062, a control portion 1063, an error correction (ECC) module 1064, a data buffer 1067 and an internal bus 1060, wherein the error correction module 1064 comprises a coding portion 1065 and a decoding portion 1066. The host I/F 1061 outputs a command and user data (write data), etc. received from the host 108 to the internal bus 1060, and sends the user data (read data) read from the memory device 104, and response from the control portion 1063, etc. to the host 108.

The memory I/F controls processing of writing and reading the user data, etc. to and from the memory device 104 based on an instruction of the control portion 1063. The control portion 1063 overall controls the memory system 102, and is, for example, a central processing unit (CPU), a micro-processing unit (MPU), etc. The control portion 1063 performs control according to a command in the case where it receives the command from the host 108 via the host I/F 1061. For example, the control portion 1063 instructs the memory I/F to write the use data and parity check to the memory device 104 according to a command from the host 108. Furthermore, the control portion 1063 instructs the memory I/F to read the user data and the parity check from the memory device 104 according to a command from the host 108.

The error correction module 1064 has the coding portion 1065 and the decoding portion 1066, and the coding portion 1065 codes the user data written to the same page and having a predetermined size to generate parity check data. The parity check data is written to a page that the user data has been written and become a coding basis, and the decoding portion 1066 uses the parity check data for decoding. The data buffer 1067 temporarily saves the user data received from the host 108 before storing it to the memory device 104, and temporarily saves the data read from the memory device 104 before sending it to the host 108. The coding portion 1065 comprises a coding circuit for coding, and the decoding portion 1066 comprises a decoding circuit for decoding.

In some particular examples, the soft decode operation may be understood as performing data re-decoding through the decoding portion (e.g., a soft decoder) in the memory controller 106, and the read operation is performed again according to re-decoded data. The RAID operation may be understood as achieving data mirroring through secondary coding to rebuild the storage data and the parity check data thereof, wherein recoding of an redundant array for the storage data could be performed in the data buffer of the memory controller 106.

For the RAID error correction operation, the written data is coded according to a related RAID coding method when written to a certain region of the memory device; the check data generated according to the write data will be stored while writing the data; and when the RAID error correction operation needs to be performed due to an error in data read, correct data is reversely solved according to the check data and other data without the error. The data written to the memory device may be grouped; each data group is recorded as a source data group; and then the write data of each source data group is subjected to an operation through a same coding equation (for example, performing an XOR operation for each group of write data) to obtain a plurality of groups of corresponding check data (Parity), wherein the plurality of groups of write data may correspond to the plurality of groups of check data one to one. When a data error or failure occurs, each group of check data may correct and recover one or more error data in one corresponding group of data, that is, the essence of the method is to solve a linear equation with one unknown through the check data. If it is desired to obtain a higher error correction capability, a plurality of different error correction coding equations need to be constructed, so as to generate a plurality of groups of check data for one group of write data. By solving an equation group, error data in one group of write data can be corrected and recovered. In some examples, the RAID error correction may be achieved through the memory controller, so as to perform error correction on the data with the read error. Each group of data may comprise data written to a plurality of memory cells, or comprise data written to a plurality of pages. The memory controller may comprise the coding portion 1065 and the decoding portion 1066, wherein the coding portion 1065 comprises a coding circuit and performs the RAID coding operation; and the decoding portion 1066 comprises a decoding circuit to perform the RAID decoding operation. Data exchange is performed with the memory device through the memory I/F 1062.

In some examples, for example, the data size for one source data group may correspond to the data stored in the memory cells coupled by one or more word lines, for example, may comprise P pieces of data written by one or more word lines, wherein P is a positive integer. A corresponding coefficient applied to RAID coding is also P. In some examples, an integration level of the memory device is higher; one source data group may comprise the write data of 2^16 pages; and therefore 2^16 or more equation coefficients are required.

During coding, a coding coefficient of RAID in the examples of the present disclosure may be subjected to a matrix operation with the source data group, to obtain the check data. A plurality of coding coefficients constitute an error correction coding equation. One error correction coding equation and the source data group are operated to obtain one check data. A plurality of error correction coding equations and the source data are subjected to multiple operations to obtain a plurality of check data. A number of the check data is a maximum data size of data recovered by the subsequent RAID decoding. The equation coefficient is the coding coefficient, and the equation coefficients corresponding to the plurality of error correction coding equations are linearly irrelevant to each other, such that the data recovered by the RAID decoding has an unique solution.

Figure 8A:
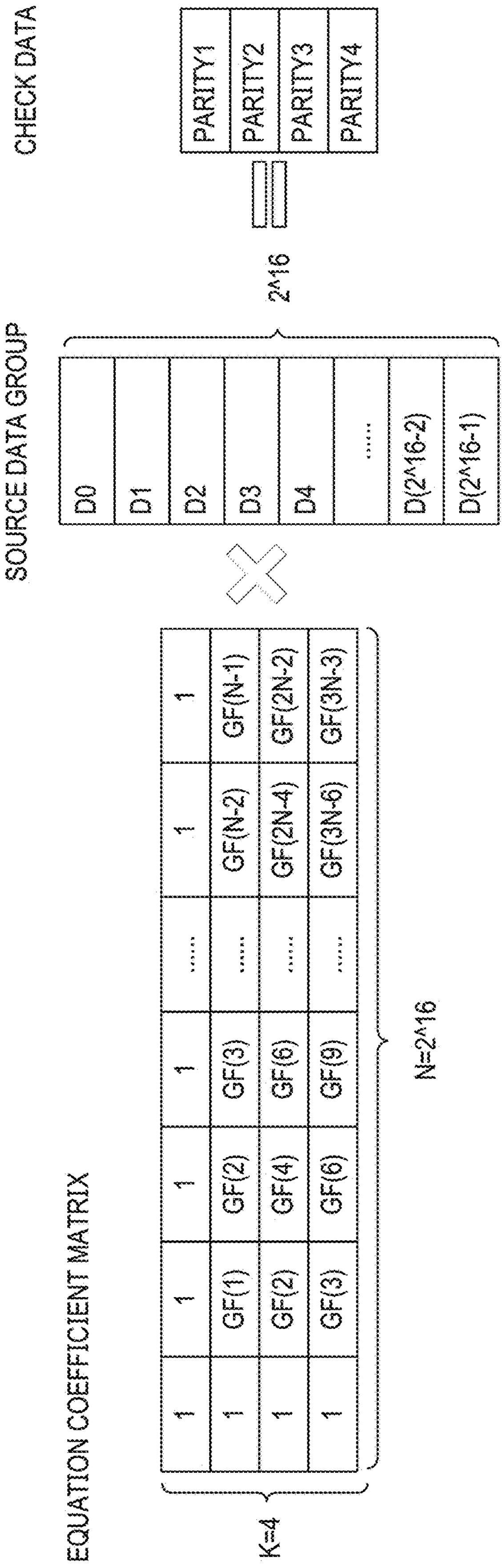

In some examples, FIG. 8A illustrates a schematic coding diagram of check data according to examples of the present disclosure. Referring to what is shown in FIG. 9A, the source data group comprises 2^16−1 data blocks, i.e., D0 to D(2^16−1), and each data block may comprise the data in one memory cell or data written to one page. D0 to D(2^16−1) form a column vector (which may be also considered a matrix only having one column), and a number of rows of the column vector is 2^16. A matrix performing a matrix multiply operation with the column vector is an equation coefficient matrix; a number n of columns of the equation coefficient matrix is equal to 2^16; each row represents one error correction coding equation; and each error correction coding equation comprises 2^16 equation coefficients, which are equal to a number of the data blocks in the source data group. A number of rows of the equation coefficient matrix, i.e., the number of the error correction coding equations, is equal to a number of the generated check data. The number k of the rows of the equation coefficient matrix shown in FIG. 8A is equal to 4, i.e., there are 4 error correction coding equations multiplied by the source data group, to obtain 4 check data, i.e., Parity 1 to Parity4. The equation matrix is a linearly independent matrix; all the equation coefficients in the first row may take 1; all the equation coefficients in the first column may take 1; and when no more than 4 data blocks of D0 to D(2^16−1) have an error at the same time, the check data having the same number as the data blocks with the error may be arbitrarily selected for decoding recovery.

In some examples, in conjunction with FIG. 8A, when RAID decoding inversely solves the source data, a matrix calculation needs to be performed on the check data and an inverse matrix of the equation coefficient matrix to inversely solve the source data group, thereby recovering the data with the read error. Alternatively, the row data corresponding to the data with the error is selected from the equation coefficient matrix to constitute a matrix, and an inverse matrix thereof is used for inversely solving the data with the read error. The equation coefficient matrix in the examples of the present disclosure may refer to the Vandermonde matrix to set coefficients, so that the equation coefficient matrix is a full rank matrix. The entire equation coefficient matrix is invertible, and an m-order matrix constituted by m rows arbitrarily taken from the equation coefficient matrix are all invertible. Referring to what is shown in FIG. 8B, each row of the Vandermonde matrix in the examples of the present disclosure may be mapped to an exponential term, for example, a first row of data may correspond to 1^0; a second row of data may correspond to an exponent of 1; a third row of data may correspond to an exponent of 2; a first column of data is all 1; and the m-order matrices constituted by m rows arbitrarily taken from the matrix are all invertible and may be linearly independent matrices. Referring to what is shown in FIG. C, when the Vandermonde matrix in FIG. 8B is applied to the equation coefficient matrix, various equation coefficients of the equation coefficient matrix correspond to the Vandermonde matrix in FIG. 8B one to one, for example, GF(1) corresponds to x^1; GF(2) corresponds to x^2; GF((k−1) (n−1)) corresponds to (x^(n−1))^(k−1).

In some examples, data processing may be carried out based on the equation coefficient matrix in FIG. 8A to obtain a new matrix, which may be labelled as a coding matrix. For example, a unit matrix (all the data on a diagonal is 1, others are 0) may be added on the basis of the equation coefficient matrix; a number of the data in each row of the unit matrix is equal to a number of the row data of the equation coefficient matrix, such that the data obtained through the matrix multiplication calculation comprises both the check data and D0 to D(2^16−1); and the data may be stored as a whole subsequently to reduce a loss of the source data.

In examples of the present disclosure, referring to what is shown in FIGS. 8A to 8C, the equation coefficient in the equation coefficient matrix may be taken from one data domain which includes numbers other than 0, and the number of the data in the data domain is greater than or equal to the number of D in the source data group. Taking D0 to D(2^16−1) in the source data group in FIG. 8A as an example, at least 2^16 data are included. Corresponding to a computer binary algorithm, x in FIG. 8B may take 2, and the equation coefficient in FIG. 8C may be recorded as 1, GF(2^1), GF(2^2), GF(2^3) and GF(2^(n−1)). 2^(n−1) may act as an element recorded or mapped in a related mapping table, and may be recorded as an element 2^i in the mapping table; an exponent portion of this element is i, and the related equation coefficient is recorded as GF(2^i).

Referring to FIG. 8D, FIG. Dd illustrates a schematic diagram of a part of an equation coefficient matrix, and only illustrates GF(2^1) to GF(2^10), i.e., the exponent portions 1 to 10, and more exponent portions are not illustrated. The equation coefficient may be associated with the mapping table for ease of firmware calling or calculation to generate the equation coefficient, and the more the equation coefficients are, the greater the data size of the mapping table is.

A memory system provided by examples of the present disclosure reduces the data size of the related mapping table and the occupation of the storage space by the related mapping table while meeting the RAID error correction coding operation or the RAID error correction decoding operation with the same write data size.

According to some aspects of an example of the present disclosure, a memory system is provided, which comprises: a memory device; a memory controller coupled with the memory device and configured to: compress a first mapping table to obtain a second mapping table, wherein the first mapping table comprises a correspondence relation between an exponent portion of each element of all elements corresponding to an error correction coding equation and an equation coefficient, and the exponent portions of all the elements are a group of continuous data; and the second mapping table comprises a correspondence relation between the exponent portions of part of all the elements and the equation coefficients, and the exponent portions of the part of the elements comprise a plurality of pieces of node data extracted from the continuous data; and acquire the equation coefficient corresponding to the exponent portion of any element of all the elements using the node data in the second mapping table through a segmented query.

In conjunction with what is shown in FIG. 8D, an error correction coding equation may be a row in the equation coefficient matrix in FIG. 8D; each element corresponding to the error correction coding equation comprise 2^i; i is a natural number and the exponent portion of each element; and the equation coefficient is a value in a row of the equation coefficient matrix. And i takes a natural number. When i is 0, the corresponding equation coefficient is 1, and when i is not 0, the corresponding equation coefficient is GF(2^i).

In conjunction with what is shown in FIG. 8B, the equation coefficient matrix constituted by the equation coefficients in the examples of the present disclosure may be a linearly independent matrix and an invertible full rank matrix, and a value of the equation coefficient May be associated with the exponent to meet the above-mentioned matrix property. Based on the equation coefficient matrix as shown in FIG. 8B, the value of a high-exponent equation coefficient may be obtained by multiplying or adding other low-exponent equation coefficients, or values of other low-exponent equation coefficients may be obtained by factorization of the value of the high-exponent equation coefficient. Based on this, referring to FIG. 9, FIG. 9 illustrates a schematic diagram of a mapping table according to an example of the present disclosure, and i taking a continuous value from 0 to 15 is taken as an example. A value of gfilog[i] in FIG. 9 may act as a value of an equation coefficient; the value of i represents the exponent portion of the equation coefficient; and when constituting the equation coefficient matrix, the value may be taken according to the mapping table in FIG. 9. In an example, 1 in FIG. 8D corresponds to the gfilog[0] value when i=0, which is 1; CF (2^1) corresponds to the gfilog[1] value when i=1, which is 2; and the maximum exponent has no corresponding value. The gfilog[i] value of the high exponent i in the mapping table in FIG. 9 may be obtained by calculating gfilog[i] of the low exponent i; when i is greater, for example, i=2^16−1, there are at least 2^16-1 pieces of data; each piece of data occupies 2 Bytes for storage; and a row of data in the mapping table requires 2^18B=256 KB. For a 32-bit LFSR circuit, a required storage space is about 16 GB, and if other items need to be mapped, the storage capacity will be further increased.

The mapping table in FIG. 9 also illustrates a gflog[i] item, and the data size of the mapping table will be doubled to reach 32 GB. gflog maps a binary form to an element exponent form, and gfilog maps the element exponent form to the binary form, providing data sources to different error correction coding and error correction decoding ways.

The mapping table in FIG. 9 may set according to a finite domain as an example, so as to define the gfilog[i] value in a value domain thereof. The elements of the mapping table in FIG. 9 may be generated by mapping to a primitive polynomial, and the value domain of gfilog[i] may be recorded as GF(2^w), w=i+1. The primitive polynomial P(x) commonly used for GF(2^w) domain may comprise: x^4+x+1, when w=4; x^8+x^4+x^3+x^2+1, when w=8; x^16+x^12+x^3+x+1, when w=16; x^32+x^22+x^2+x+1, when w=32; and x^64+x^4+x^3+x+1, when w=64.

When the primitive polynomial corresponding to the mapping table in FIG. 9 is P(x)=x^4+x+1, with i=0, 1, 2, 3, the exponent portion does not exceed 4, and gfilog[i]=x^i (2^i) value.

$$i = 4,\ gfilog[4] = x\hat{}4 = x\hat{}3 * x = x\hat{}4 \bmod P(x) = x + 1 = 2 + 1 = 3;$$

$$i = 5,\ gfilog[5] = x\hat{}5 = x\hat{}4 * x = (x + 1) * x = x\hat{}2 + x = 4 + 2 = 6;$$

$$i = 6,\ gfilog[6] = x\hat{}6 = x\hat{}5 * x = (x\hat{}2 + x) * x = x\hat{}3 + x\hat{}2 = 8 + 4 = 12;$$

$$i = 7,\ gfilog[7] = x\hat{}7 = (x\hat{}3 + x\hat{}2) * x = (x\hat{}4 + x\hat{}3 \bmod P(x)) = x\hat{}3 + x + 1 = 8 + 2 + 1 = 11.$$

The subsequent gfilog[i] values are generated sequentially, which is no longer repeated.

It is understood that, with the increase of the i value, the primitive polynomial corresponding to the gfilog[i] value of the next i is the primitive polynomial corresponding to the gfilog[i] value of the previous i multiplied by x, for example, gfilog[4]=x^4=x^3*x, gfilog[5]=x^5=x^4*x. That is to say, after a formation algorithm of the primitive polynomial is fixed, both the current i and the gfilog[i] value may be obtained by calculating the previous i and gfilog[i] value.

It is to be noted that the gfilog[i] value and gflog[i] value as shown in the mapping table of FIG. 9 do not increase with the increase of the i value and do not decrease with the decrease of the i value. Taking the gfilog[i] value as an example, the value thereof may perform a modulus calculation on a certain polynomial, so the value thereof is fixed in the finite domain, and the value thereof is not positively or negatively correlated with the i value. The values of i, gfilog[i] and gflog[i] are all defined in a similar range in the entire mapping table, for example, the value range of i in FIG. 9 is 0-15; the value range of gflog[i] is 0-14; and the value range of gfilog[i] is 1-15. The mapping table may be compressed in examples of the present disclosure; part of data of the mapping table is retained; and other data may be obtained by calculation according to the known data, thereby reducing a volume of the mapping table and the occupation of the storage capacity.

In some examples, referring to FIG. 10A, FIG. 10A illustrates a schematic diagram of a first mapping table, and the first mapping table may only comprise a gfilog[i] value. The first mapping table records or maps a numerical value correspondence relation between the exponent portion (i) and the equation coefficient (gfilog[i]). When FIG. 10A comprises all corresponding gfilog[i] values when the continuous exponent portion is from 0 to (2^16−1), and the first mapping table is a uncompressed mapping table. As mentioned above, the high-exponent gfilog value may be obtained by calculation according to one or more low-exponent gfilog values, and the calculation means may comprise a multiplication operation, an addition operation or an inverse operation of multiplication and addition. Accordingly, referring to what is shown in FIG. 10B, the first mapping table is compressed; several exponents (several i values) are selected from the first mapping table as nodes of all i values; and several corresponding gfilog[i] values act as the node data of all gfilog[i] values; every two i values may be spaced by an interval, so that all gfilog[i] values in the first mapping table are divided into several data segments; when the gfilog[i] value corresponding to a certain i value is required, the gfilog[i] value corresponding to the required i value is calculated according to a node interval where the i value is located and gfilog[i] values before and after it.

In an example, in FIG. 10B, by taking i=256, and gfilog[256] being node data, as well as i=521, and gfilog[521] being another node data as an example, when 256<i<521, the gfilog[i] value corresponding to any i value (256<i<521) is calculated through the gfilog[256] value. For example, i=288, it is judged that i falls between 256 and 521, and gfilog[256] corresponding to the 256 value is accordingly 2863 by accessing and looking up the second mapping table; at this time, an offset is 288−256=32; and gfilog[288] is calculated as 59187 according to the gfilog[i] generation method described above and through the offset. Similarly, all or any multiple gfilog[i] values of the first mapping table may be recovered by segmented querying of the related node data in the second mapping table, and thus all equation coefficients required to build the equation coefficient matrix currently are obtained. While the compressed second mapping table may acquire any equation coefficient or may recover the first mapping table, the data size included therein is less than the data size of the first mapping table before compression, and thus the data size of the mapping table and the storage occupation of the mapping table are reduced. It is to be noted that the first mapping table in FIG. 10A may be obtained by adding elements based on the mapping table in FIG. 9. i=15 in FIG. 10A is not the last element anymore, and gfilog[15] is valid data.

Taking the mapping table in FIG. 9 as an example, i takes 0 to 15; a finite domain, i.e., a GF domain, is recorded as all values from 0 to 15; all elements thereof are 16; and all values of the corresponding gfilog[i] also fall within the GF domain, i.e., any gfilog[i] value will be equal to one value from 0 to 15. The GF domain may be selected or set according to a Galois domain. In the Galois domain, each element may be generated according to an exponential polynomial; results of adding, subtracting, multiplying and dividing operations of numerical values all fall in this domain, so the Galois domain can meet setting characteristics of the equation coefficient in the examples of the present disclosure; and when the related operations are performed, the operation results may be obtained by querying the numerical value in the Galois domain, thereby simplifying the calculation and saving calculation power.

Referring to what is shown in FIG. 9, the gfilog[i] value is set according to calculation rules of the Galois domain; a high-exponent gfilog[i] value may be obtained by one or more low-exponent gfilog[i] values by calculation; and the value of gfilog[i] falls within the value domain of all i values. And gfilog[i] may be an inverse table of the mapping table associated with the Galois domain, representing that the exponential form of the element is mapped to the binary form; and gfilog[i] may be a forward table of the mapping table associated with the Galois domain, representing that the binary form is mapped to the exponential form of the element. Based on an association relationship between the inverse table and the forward table of the setting rules of the Galois domain, when gfilog[i=n]=m, gflog[i=m]=n. In an example, gfilog[4]=3, and gflog[3]=4. The inverse table may be obtained from the forward table, and the forward table may be obtained from the inverse table. As mentioned above, the first mapping table in the examples of the present disclosure may comprise gfilog[i]. In some other examples, the first mapping table may also comprise gflog[i], which is used for looking up the table for calculation, thereby simplifying the algorithm and saving the calculation power.

Figure 10C:
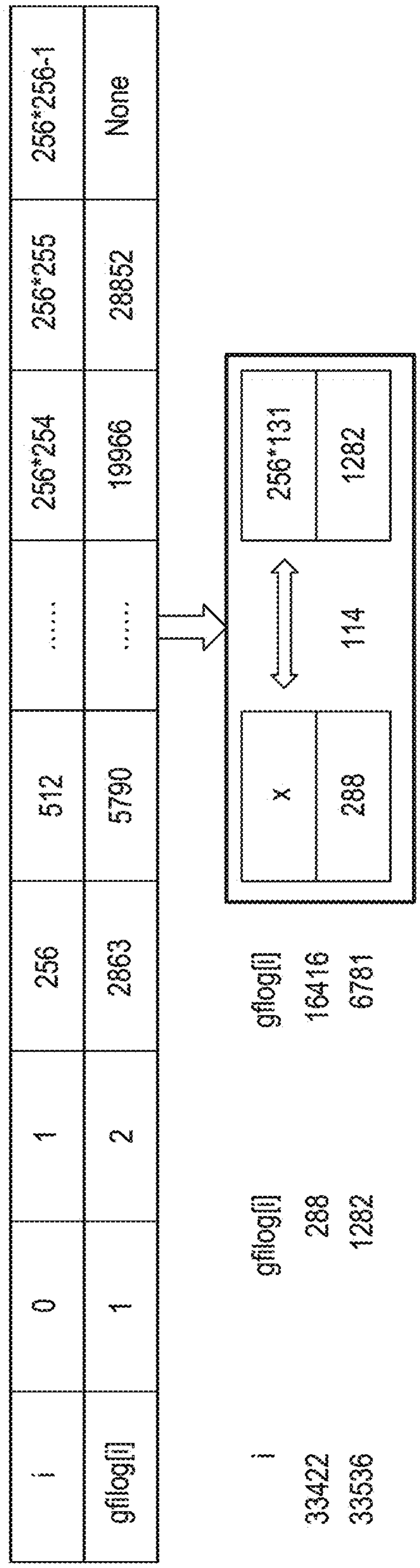
FIG. 10C is a schematic diagram of a lookup calculation method according to an example of the present disclosure.

Referring to what is shown in FIG. 10B, the first mapping table may also comprise a gflog[i] value; the mapping table constituted by the gflog[i] value may be also compressed, or the first mapping table does not comprise the gflog[i] value. The gflog[i] value may be obtained from the gfilog[i] value in the first mapping table by calculation, or obtained from the compressed second mapping table by calculation. As mentioned above, when gfilog[i=n]=m, gflog[i=m]=n. The gflog[i] value calculated by the uncompressed first mapping table is no longer repeated, and taking FIG. 10C as an example, the gflog[i] value is calculated by the compressed second mapping table. For example, if solving gflog[2863], i.e., solving the i value when giflog[i]=2863, by looking up the table, it shows that giflog[256]=2863 is recorded by the second mapping table, i.e., gflog[2863]=256 is obtained. For another example, if solving gflog[288], giflog[i]=288 is not recorded by the second mapping table, and at this time, when gfilog[i]=288, the i value needs to be solved inversely. A algorithm here is gfilog[i+i_offset]=N, and enabling N to be queried in the gfilog[i] table and recording the values from i_offset; finally, gflog[288]=33422 is obtained; gfilog [i=256*131=33536]=N=1282, and i_offset=−114.

The mapping table in the examples of the present disclosure is presented in a decimal form for ease of description, and the storage, calling and calculation processes in the actual memory system are carried out in binary.

In some examples, all the elements and the corresponding equation coefficients are all finite domains, and the memory controller is configured to: generate all the elements corresponding to the error correction coding equation; generate the first mapping table according to all the elements; group the exponent portion of each element of all the elements in the first mapping table and the corresponding equation coefficient, and select the exponent portion of a fixed element in each group as the node data; and obtain the second mapping table using the node data and the equation coefficient corresponding to the node data.

In examples of the present disclosure, all the elements corresponding to the error correction coding equation are generated. If the corresponding source data group comprises D0, D1, and D2 to D(2^i) data blocks, all corresponding optional elements are 0 to 2^i; i is the exponent portion of the element; and the equation coefficient may be gfilog[i].

For example, as shown in FIG. 9, the source data group that needs to be coded comprises D0, D1, and D2 to D(2^4−1); the number of all elements is 16; the element may be expressed as 2^i; i takes all natural numbers from 0 to 15; all elements of 2^0, and 2^1 through 2^15 are generated sequentially; the corresponding first mapping table may at least comprise gfilog[0], and gfilog[1] through gfilog[15]; and a gfilog[15] value is invalid.

For another example, as shown in FIG. 10A, the source data group that needs to be coded comprises D0, D1, and D2 to D(2^16−1); the number of all elements is 2^16−1; the element may be expressed as 2^i; i takes all natural numbers from 0 to (256*256-1); all elements of 2^0; and 2^1 through 2^(256*256−1) are generated sequentially; the corresponding first mapping table may at least comprise gfilog[0], and gfilog[1] through gfilog[256*256-1]; and a gfilog[256*256-1] value is invalid.

The first mapping table in FIG. 10A is grouped according to the i value of the exponent portion; each group comprises a value interval of a section of i values; one i value of each group acts as the node data; and the gfilog[i] value corresponding to the i value is the equation coefficient corresponding to the node data. For example, the i values 0 to 255 act as one groupand the i values 256 to 511 act as one group until all elements from 0 to (256*256−1) are divided. One or more node data in each group are recorded and the corresponding gfilog[i] values are recorded in the second mapping table. There may be any number of grouped i value intervals, and the number of the i values included in each group may be the same or different.

In some examples, a total number of the elements included in each group is substantially the same; the exponent portions of all the elements included in each group are a group of continuous data; and the exponent portion of the fixed element in each group is a first piece of data of the continuous data in each group.

In an example, in FIG. 10A, 256 i values act as one group; the elements from 0 to (256*256−1) are divided into 256 groups; the total numbers of the elements in each group may be equal; and the first element of each group acts as a fixed element and is recorded in the second mapping table. A small number of other elements may be recorded more in some groups, and the total number is substantially the same. For example, the first group also records the second element in addition to the first fixed element. Since the exponent of being 0 as the equation coefficient may be used repeatedly for many times when building the equation coefficient matrix as shown in FIG. 8D, or a value 1 is directly assigned without accessing the mapping table, so as the second element of the first group, i=1 will be also recorded, i.e., i=0 and i=1 are recorded simultaneously. The first element of each group may only be recorded for other groups, such as recording i=256, 512, 256*254, and 256*255, the last element 256*256−1 in addition to the first fixed element may be also recorded for the last group, and its corresponding gfilog[i] value is invalid.

In some examples, the memory controller further comprises a coding circuit which is configured to: generate a corresponding equation coefficient matrix according to all the elements; generate a coding matrix using the equation coefficient matrix; and perform a coding operation on storage data to be written to the memory device using the coding matrix, to obtain check data corresponding to the storage data.

In some examples, the memory controller further comprises a decoding circuit which is configured to: perform a decoding operation using the error correction decoding inverse matrix, the remaining storage data without the error and the check data corresponding to the storage data, to obtain recovered storage data.

Referring to what is shown in FIG. 7, the memory controller 106 may comprise a coding portion 1065 and a decoding portion 1066.

The coding portion 1065 may comprise a coding circuit for coding to generate a coding matrix and perform a coding operation on the storage data to generate the check data; and the decoding portion 1066 may comprise a decoding circuit, which performs decoding using the check data to recover the storage data with the error.

Taking the equation coefficient matrix generated in FIG. 8D as an example, the equation coefficient matrix in FIG. 8D may be a complete equation coefficient matrix coding D0, D1, and D2 to D5, and also an example of an equation coefficient matrix coding more data. A unit matrix (all the data on a diagonal is 1, and others are 0) is added on the basis of the equation coefficient matrix as shown in FIG. 8D, to generate the coding matrix of FIG. 11A. A number of the data in each row of the unit matrix is equal to a number of row data of the equation coefficient matrix, such that the data obtained through the matrix multiplication calculation comprises both the check data P1, P2 and P3 and source data of D0, D1, and D2 to D5, which may be used for recovering at most any 3 errors in D0 to D5.

Figure 11A:
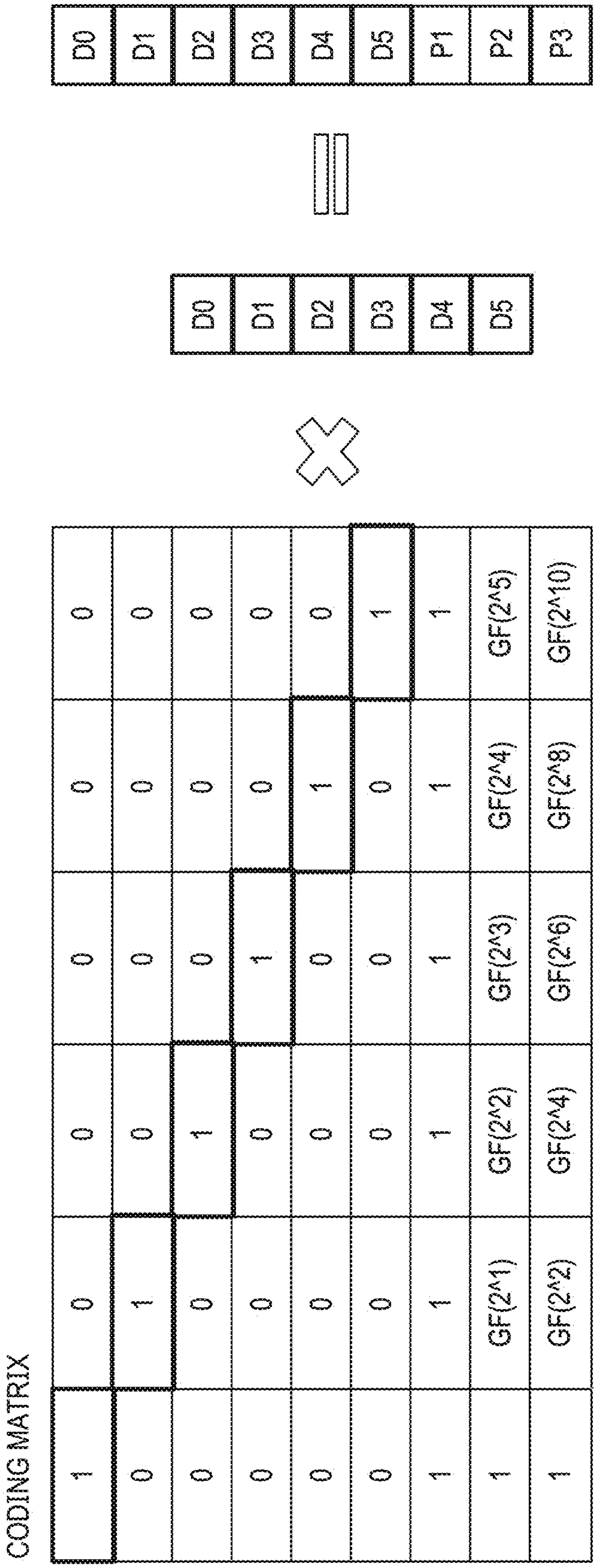
FIG. 11A to FIG. 11E are schematic diagrams of error correction coding and error correction decoding according to an example of the present disclosure.
Figure 11B:
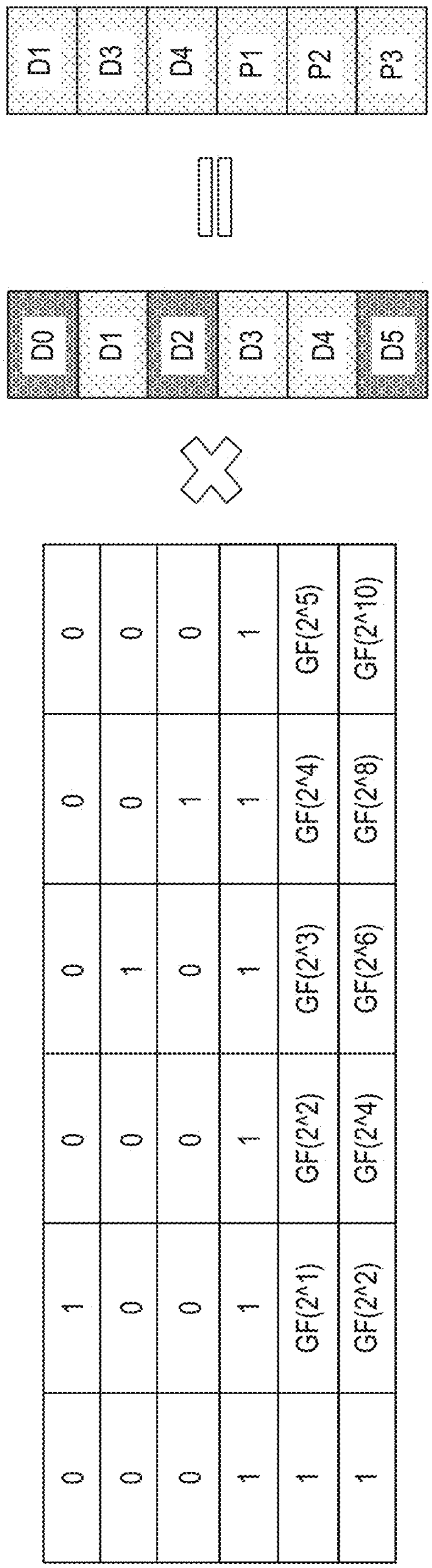

Referring to what is shown in FIG. 11B, by taking three data blocks with the errors as an example, when D0, D2 and D5 therein have an error, the coefficient matrix multiplied by a column vector including the error data is a 6×6 matrix at this time. For ease of understanding, the 6×6 square matrix is called an R matrix here. The R matrix is part of the coding matrix in FIG. 11A and retains three rows of equation coefficients corresponding to generation of P1 to P3, i.e., retains part of the original equation coefficient matrix, and also retains the three rows of equation coefficients corresponding to the data without the error.

Figure 11C:
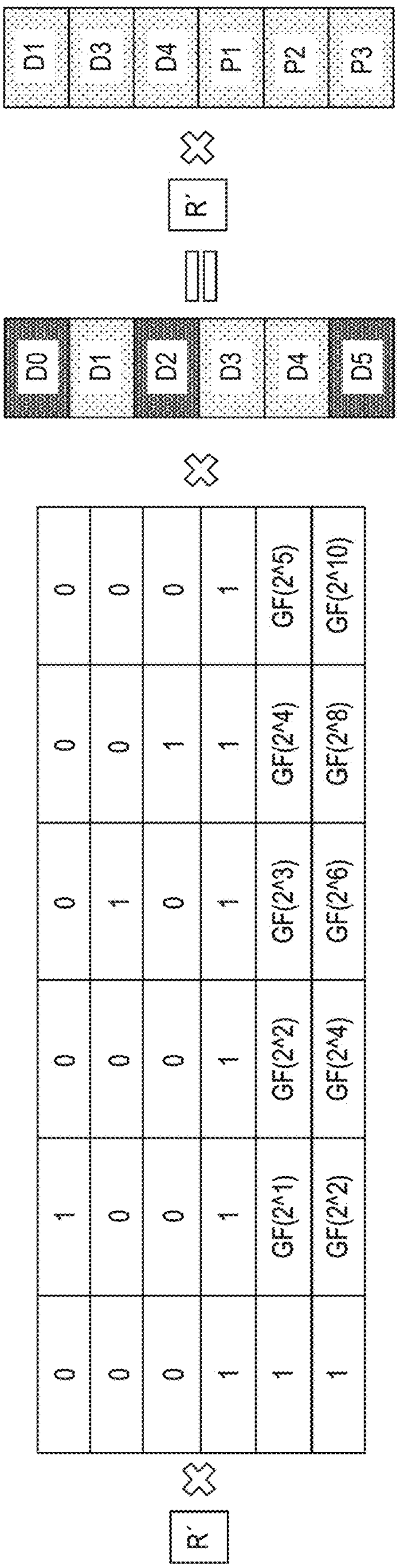
Figure 11D:
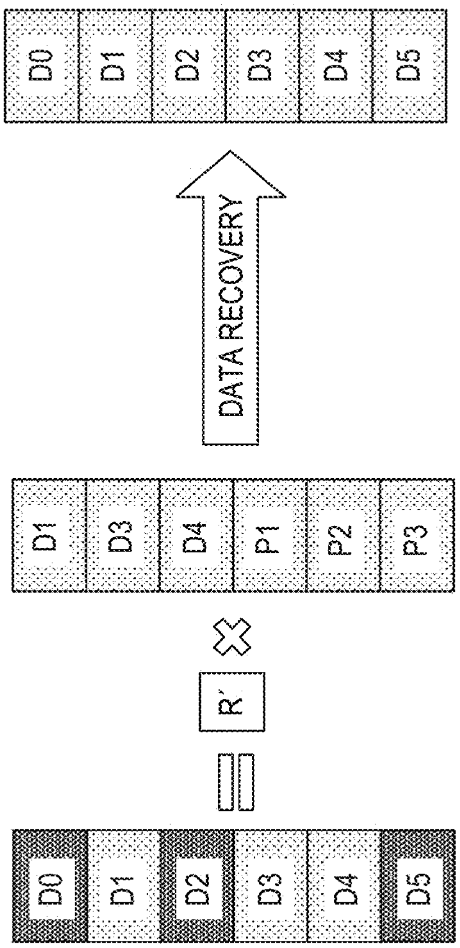

Referring to what is shown in FIG. 11C, an inverse matrix R' of the R matrix is generated, R' may be recorded as the error correction decoding inverse matrix, and when both sides of the equal sign are multiplied, the R' equation is also possible. After the equation in FIG. 11C deforms, the equation as shown in FIG. 11D is obtained, to recover the D0, D2 and D5 with the error. If the data of two data blocks D is recovered, any two of P1 to P3 may be arbitrarily selected, similar to the R' error correction inverse matrix built in FIG. 11C; and if more data needs to be recovered, more Ps are generated in the coding stage. The coding circuit involved in the examples of the present disclosure may also perform other coding operations than the coding operation in FIG. 11A, and the decoding circuit may also perform other decoding operations than the decoding operation in FIG. 11D.

In some examples, the memory controller is further configured to: obtain an error correction decoding inverse matrix by querying the node data in the second mapping table and a corresponding bias calculation when an error occurs in reading the storage data in the memory device; and perform an error correction using the error correction decoding inverse matrix.

Figure 11E:
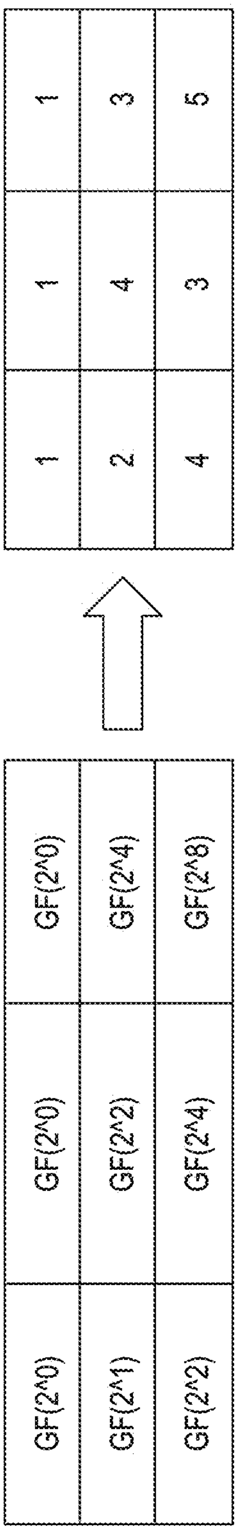

Referring to what is shown in FIG. 11E, 2^i in the equation coefficient GF(2^i) as shown in FIGS. 11A to 11C corresponds to an element in the mapping table of FIGS. 9 to 10A; the exponent i corresponds to the i value of the mapping table; a gfilog[i] value of the mapping table is looked up according to the i value to obtain the GF(2^i) value; and then the required equation coefficient matrix and the coding matrix are generated. A data row corresponding to the coding matrix is selected according to a location of the data to be recovered in the source data group to constitute a new R matrix; the R matrix is biased, calculated and inversed to obtain the error correction decoding inverse matrix; and the source data is solved using the error correction decoding matrix.

In some examples, the memory controller is configured to: acquire a plurality of elements corresponding to the storage data with the error when the error occurs in reading the storage data in the memory device; obtain a first matrix using a plurality of elements corresponding to the storage data with the error; acquire the equation coefficient corresponding to the exponent portion of each element in the first matrix, to obtain a second matrix; and calculate an inverse matrix of the second matrix, to obtain the error correction decoding inverse matrix.

Referring to the first matrix with the exponent portion as shown in FIG. 12A, x and i in the mapping table of FIG. 9 have the same meaning; x may take 2; the second matrix is the matrix with the values being taken by querying the mapping table of FIG. 9; and the inverse matrix is an inverse matrix of the second matrix. Taking D0, D2 and D5 with read errors as an example, the first matrix is a trivalent matrix; D0 corresponds to 1, 1, and 1 of a first column of data as shown in FIG. 8D; D2 corresponds to 1, GF(2^2) and GF(2^4) of a third column of data; and D5 corresponds to 1, GF(2^5) and GF(2^10) of a sixth column of data.

Referring to what is shown in FIG. 12B, during a coding process, the result obtained by the matrix operation of the first matrix with D0, D2 and D5 with the error is a third matrix.

Through the matrix operation as shown in FIG. 11A, the operation result may be shown with reference to the exponential form of the first matrix:

$$P1 = D0 + D1 + D2 + D3 + D4 + D5;$$

$$P2 = D0 + x\hat{}1 * D1 + x\hat{}2 * D2 + x\hat{}3 * D3 + x\hat{}4 * D4 + x\hat{}5 * D5; \text{ and}$$

$$P3 = D0 + x\hat{}2 * D1 + x\hat{}4 * D2 + x\hat{}6 * D3 + x\hat{}8 * D4 + x\hat{}10 * D5$$

The values of P1, P2 and P3 are represented by D1, D3 and D4 without the error, and taken into the numerical values of the third matrix in FIG. 12B. The matrix constituted by D0, D2 and D5 is equal to a product of the inverse matrix and the third matrix. For example, D0+D2+D5=P1-D1-D3-D4, as mentioned above, the numerical value of the mapping table in the examples of the present disclosure is defined in a closed domain; both the addition and subtraction operations are binary XOR calculations; and the addition is the same as the subtraction. In this example, the addition and subtraction may be unified into the addition operation and recorded as D0+D2+D5=P1+D1+D3+D4, and the inverse matrix may be part of data of the error correction decoding inverse matrix R' in FIG. 11C. FIG. 12C illustrates a process of solving D0, D2 and D5 by looking up the mapping table in FIG. 9, FIG. 10A or FIG. 10B according to the exponent portion and through the matrix operation. The specific numerical value may be solved first and shown in the table of FIG. 12C, and then the corresponding specific numerical value is mapped to the element with the exponent portion and shown in the table of FIG. 12D. In some examples, when D1 and D4 have read errors, a first matrix is constructed; the first matrix is a second-order matrix; D1 corresponds to 1 and GF(2^1) of the second column of data shown in FIG. 8D; and D4 corresponds to 1 and GF(2^4) of the fifth column of data. The first matrix and the inverse matrix of the first matrix are as shown in FIG. 13A; the process of solving D1 and D4 using the inverse matrix is similar to a process of solving D0, D2 and D5, which is no longer repeated. In some examples, the calculation for various specific numerical values of the matrices in FIG. 12C and FIG. 12B may be carried out according to the calculation rules of the closed domain in examples of the present disclosure instead of the decimal operation, whereby various calculated numerical values are defined in the closed domain to limit the number of bits and the size of the operation data.

Still taking the mapping table in FIG. 9 as an example, the example that the data obtained by table query is subjected to the addition, subtraction, multiplication and division operations is as follows:

Addition, 6+7=b0110 xor b0111=b0001=1 (decimal), xor is the binary XOR calculation; the same numerical value in the corresponding numerical digit is 0 for the same and 1 for the difference.

Subtraction, 9-3=b 1001 xor b 0011=b 1010=10 (decimal).

Multiplication, 7*9-gfilog[gflog[7]+gflog[9]]=gfilog[10+14]=gfilog[24 mod 15]=gfilog[9]=10; gfilog[9] value is obtained by querying the mapping table of FIG. 9.

Division, 13/11-gfilog[gflog[13]-gflog[11]]=gfilog[13-7]=gfilog[6]=12; gfilog[6] value is obtained by querying the mapping table of FIG. 9. The results of the addition and subtraction operations are the same, so the subtraction involved in FIG. 12C and FIG. 13B in the examples of the present disclosure may be replaced with the addition.

In some examples, the memory controller is configured to: for the exponent portion of each element in the first matrix, determine a group in which the exponent portion of the respective element falls and a deviation value of the exponent portion of the respective element from the exponent portion of the respective fixed element falling in the group; obtain the equation coefficient corresponding to the exponent portion of the respective fixed element falling in the group by querying the second mapping table; and calculate the equation coefficient corresponding to the exponent portion of the respective element using the obtained equation coefficient and the deviation value.

When the second mapping table is the compressed mapping table, for various numerical values of the first matrix, which group that the exponent falls in may be determined with reference to what is shown in FIG. 10B, and various numerical values of the first matrix are obtained by calculation according to the fixed element value of the group recorded in the second mapping table.

In some examples, at least one of the coding circuit or the decoding circuit comprises an linear feedback shift register circuit which is configured to cache the first mapping table or the second mapping table. The linear feedback shift register circuit may be located in the coding circuit in the coding portion 1065 and/or the decoding circuit in the decoding portion 1066 of FIG. 7.

Here, the linear feedback shift register circuit refers to a shift register using a linear function of an output of a previous state as an input when the output is given. The XOR operation may be performed by the linear feedback shift register circuit. Some bits of the register act as the input after an XOR operation, and then every bit in the register is subjected to an overall shift.

In some examples, the memory controller is further configured to: perform a read operation on the storage data in the memory device; when an error occurs to the read storage data, perform read retry processing on the storage data with the error; when an error still occurs to the storage data after performing the read retry processing, perform soft decoding processing on the storage data still with the error; and when an error still occurs to the storage data after performing the soft decoding processing, perform an error correction through the error correction decoding inverse matrix.

Referring to what is shown in FIG. 6, when the memory controller 106 controls the memory device 104 to perform the read operation, an FW default read operation is performed on the memory cell of the corresponding physical address first; a read retry operation is performed after the FW default read operation fails; a soft decode operation is performed after the read retry operation fails; an Redundant Array of Independent Disk operation is performed after the soft decode operation fails; the read operation stops after the RAID operation fails, and read fails due to incapability of error correction; and the memory controller 106 sends a read fail signal to the host 108. The read retry operation and the FW default read operation may be applied to hard decode.

In some examples, the second mapping table is stored in the memory device or a read-only memory (ROM) of the memory controller. When the memory device is not powered on, the second mapping table may be stored in the memory cell array of the memory device, and when the memory device is powered on, the second mapping table may be written to the memory device or the ROM of the memory controller.

According to some aspects of examples of the present disclosure, a memory controller 106 is provided, and the memory controller 106 is configured to: compress a first mapping table, to obtain a second mapping table, wherein the first mapping table comprises a correspondence relation between an exponent portion of each element of all elements corresponding to an error correction coding equation and an equation coefficient, the exponent portions of all the elements are a group of continuous data; the second mapping table comprises a correspondence relation between the exponent portions of part of all the elements and the equation coefficients, and the exponent portions of the part of the elements comprise a plurality of pieces of node data extracted from the continuous data; and acquire the equation coefficient corresponding to the exponent portion of any element of all the elements using the node data in the second mapping table through a segmented query.

According to some aspects of examples of the present disclosure, an operation method of a memory system is provided in FIG. 14, which comprises: compressing a first mapping table to obtain a second mapping table, wherein the first mapping table comprises a correspondence relation between an exponent portion of each element of all elements corresponding to an error correction coding equation and an equation coefficient, and the exponent portions of all the elements are a group of continuous data; and the second mapping table comprises a correspondence relation between the exponent portions of part of all the elements and the equation coefficients, and the exponent portions of the part of the elements comprise a plurality of pieces of node data extracted from the continuous data; and acquiring the equation coefficient corresponding to the exponent portion of any element of all the elements using the node data in the second mapping table through a segmented query.

In some examples, all the elements and the corresponding equation coefficients are all finite domains, and the method further comprises: generating all the elements corresponding to the error correction coding equation; generating the first mapping table according to all the elements; during a process of compressing the first mapping table, grouping the exponent portion of each element of all the elements in the first mapping table and the corresponding equation coefficient, and selecting an exponent of a fixed element in each group as node data; and obtaining the second mapping table using the node data and the corresponding equation coefficient.

In some examples, a total number of the elements included in each group is substantially the same, the exponent portions of all the elements included in each group are a group of continuous data, and the exponent portion of the fixed element in each group is a first piece of data of the continuous data in each group.

In some examples, the method further comprises: obtaining an error correction decoding inverse matrix by querying the node data in the second mapping table and a corresponding bias calculation when an error occurs in reading the storage data in the memory device; and performing an error correction using the error correction decoding inverse matrix.

In some examples, the obtaining the error correction decoding inverse matrix by querying the node data in the second mapping table and the corresponding bias calculation comprises: acquiring a plurality of elements corresponding to the storage data with the error when the error occurs in reading the storage data in the memory device; obtaining a first matrix using a plurality of elements corresponding to the storage data with the error; acquiring the equation coefficient corresponding to the exponent portion of each element in the first matrix, to obtain a second matrix; and calculating an inverse matrix of the second matrix, to obtain the error correction decoding inverse matrix.

In some examples, the acquiring the equation coefficient corresponding to the exponent portion of each element in the first matrix comprises: for the exponent portion of each element in the first matrix, determining a group in which the exponent portion of the respective element falls and a deviation value of the exponent portion of the respective element from the exponent portion of the respective fixed element falling in the group; obtaining the equation coefficient corresponding to a power exponent of the respective fixed element falling in the group by querying the second mapping table; and calculating the equation coefficient corresponding to the exponent portion of the respective element using the obtained equation coefficient and the deviation value.

In some examples, the method further comprises: generating a corresponding equation coefficient matrix according to all the elements; generating a coding matrix using the equation coefficient matrix; and performing a coding operation on storage data to be written to the memory device using the coding matrix, to obtain check data corresponding to the storage data.

In some examples, the performing the error correction using the error correction decoding inverse matrix comprises: performing a decoding operation using the error correction decoding inverse matrix, the remaining storage data without the error and the check data corresponding to the storage data, to obtain recovered storage data.

In some examples, the method further comprises: performing a read operation on the storage data in the memory device; when an error occurs to the read storage data, performing read retry processing on the storage data with the error; when an error still occurs to the storage data after performing the read retry processing, performing soft decoding processing on the storage data still with the error; and when an error still occurs to the storage data after performing the soft decoding processing, perform an error correction through the error correction decoding inverse matrix.

According to some aspects of an example of the present disclosure, a readable storage medium is provided. The readable storage medium stores a computer program which, when being executed, implements the operation method.

The memory device may comprise a NAND memory, the memory cell of the NAND memory may either comprise a floating gate type memory cell that includes a floating gate transistor, or a charge trapping type memory cell that includes a charge trapping transistor.

The storage medium may be a Ferromagnetic Random Access Memory (FRAM), a Read Only Memory (ROM), a Programmable Read-Only Memory (PROM), an Erasable Programmable Read-Only Memory (EPROM), an Electrically Erasable Programmable Read-Only Memory (EEPROM), a Flash Memory, a magnetic surface memory, an optical disk, or a Compact Disc Read-Only Memory (CD-ROM) and other memories, or various apparatuses including any one or any combination of the above memory devices.

In some examples, an executable instruction may be programmed in any form of programming language (including a compiling or interpreting language, or a declarative or procedural language) by adopting a form of a program, a software, a software module, a script or a code; and it may be deployed in any form, including deployed as an independent program or as a module, a component, a subroutine, or other units suitable for use in a computing environment.

As an example, the executable instruction may, but do not necessarily, correspond to files in a file system, may be stored in part of a file storing other programs or data, for example, stored in one or more scripts in a Hyper Text Markup Language (HTML) document, stored in single file dedicated for the discussed program, or stored in a plurality of cooperative files (e.g., the file for storing one or more modules, subprograms or code portions).

As an example, the executable instruction may be deployed on an electronic apparatus for execution, or on a plurality of electronic apparatuses at one site for execution, or distributed on a plurality of electronic apparatuses interconnected through a communication network at a plurality of sites for execution.

The above descriptions are merely preferred examples of the present disclosure, and not intended to limit the patent scope of the present disclosure. Equivalent structure transformation made using the contents of the specification and the drawings of the present disclosure under the inventive concept of the present disclosure, or direct/indirect application to other related technical fields are both encompassed within the patent protection scope of the present disclosure.

What is claimed is:

1. A memory system, comprising:
- a memory device; and
- a memory controller coupled with the memory device and configured to:
  - compress a first mapping table to obtain a second mapping table, wherein
  - the first mapping table comprises a correspondence relation between an exponent portion of each element of elements corresponding to an error correction coding equation and an equation coefficient, and the exponent portions of the elements are a group of continuous data; and
  - the second mapping table comprises a correspondence relation between the exponent portions of part of the elements and the equation coefficients, and the exponent portions of the part of the elements comprise node data in the continuous data; and
- obtain the equation coefficient corresponding to the exponent portion of any element of the elements based on the node data in the second mapping table and a segmented query.

2. The memory system of claim 1, wherein the elements and the corresponding equation coefficients are finite domains, and the memory controller is configured to:
- generate the elements corresponding to the error correction coding equation;
- generate the first mapping table according to the elements;

group the exponent portion of each element of the elements in the first mapping table and the corresponding equation coefficient, and select the exponent portion of a fixed element in each group as the node data; and obtain the second mapping table based on the node data and the equation coefficient corresponding to the node data.

3. The memory system of claim 2, wherein the exponent portions of the elements in each group are a group of continuous data, and the exponent portion of the fixed element in each group is a first data of the continuous data in each group.

4. The memory system of claim 2, wherein the memory controller is further configured to:

obtain an error correction decoding inverse matrix by the node data in the second mapping table and a corresponding bias calculation in response to an error occurring in reading storage data in the memory device; and perform an error correction based on the error correction decoding inverse matrix.

5. The memory system of claim 4, wherein the memory controller is configured to:

obtain a plurality of elements corresponding to the storage data with the error in response to the error occurring in reading the storage data in the memory device;

obtain a first matrix based on elements corresponding to the storage data with the error;

obtain a second matrix based on the equation coefficient corresponding to the exponent portion of each element in the first matrix; and calculate an inverse matrix of the second matrix, to obtain the error correction decoding inverse matrix.

6. The memory system of claim 5, wherein the memory controller is configured to:

determine a group in which the exponent portion of each element in the first matrix falls and a deviation value of the exponent portion of each element in the first matrix from the exponent portion of the respective fixed element falling in the group;

obtain the equation coefficient corresponding to the exponent portion of the respective fixed element falling in the group by querying the second mapping table; and calculate the equation coefficient corresponding to the exponent portion of the respective element based on the obtained equation coefficient and the deviation value.

7. The memory system of claim 4, wherein the memory controller further comprises a coding circuit which is configured to:

generate a corresponding equation coefficient matrix according to the elements;

generate a coding matrix based on the equation coefficient matrix; and perform a coding operation on storage data to be written to the memory device based on the coding matrix, to obtain a check data corresponding to the storage data.

8. The memory system of claim 4, wherein the memory controller further comprises a decoding circuit which is configured to:

perform a decoding operation based on the error correction decoding inverse matrix, a remaining storage data without the error and a check data corresponding to the storage data, to obtain recovered storage data.

9. The memory system of claim 7, wherein at least one of the coding circuit or a decoding circuit comprises a Linear Feedback Shift Register (LFSR) circuit.

10. The memory system of claim 4, wherein the memory controller is further configured to:

perform a read operation on the storage data in the memory device;

in response to an error occurring to the read storage data, perform read retry processing on the storage data with the error;

in response to an error occurring to the storage data after performing the read retry processing, perform soft decoding processing on the storage data with the error; and in response to an error occurring to the storage data after performing the soft decoding processing, perform an error correction through the error correction decoding inverse matrix.

11. The memory system of claim 1, wherein the second mapping table is stored in the memory device or a Read-Only Memory (ROM) of the memory controller.

12. A method of operating a memory system, comprising:

compressing a first mapping table, to obtain a second mapping table, wherein:

the first mapping table comprises a correspondence relation between an exponent portion of each element of elements corresponding to an error correction coding equation and an equation coefficient, the exponent portions of the elements are a group of continuous data; and the second mapping table comprises a correspondence relation between the exponent portions of part of the elements and the equation coefficients, and the exponent portions of the part of the elements comprise node data in the continuous data; and obtaining the equation coefficient corresponding to the exponent portion of any element of the elements based on the node data in the second mapping table and a segmented query.

13. The method of claim 12, wherein the elements and the corresponding equation coefficients are finite domains, and the method further comprises:

generating the elements corresponding to the error correction coding equation;

generating the first mapping table according to the elements;

during a process of compressing the first mapping table, grouping the exponent portion of each element of the elements in the first mapping table and the corresponding equation coefficient, and selecting an exponent of a fixed element in each group as node data; and obtaining the second mapping table based on the node data and the corresponding equation coefficient.

14. The method of claim 13, wherein the exponent portions of the elements in each group are a group of continuous data, and the exponent portion of the fixed element in each group is a first piece of data of the continuous data in each group.

15. The method of claim 13, wherein the method further comprises:

obtaining an error correction decoding inverse matrix by the node data in the second mapping table and a corresponding bias in response to an error occurring in reading storage data in the memory system; and performing an error correction based on the error correction decoding inverse matrix.

16. The method of claim 15, wherein the obtaining the error correction decoding inverse matrix by the node data in the second mapping table and the corresponding bias comprises:

obtaining a plurality of elements corresponding to the storage data with the error when the error occurring in reading the storage data in the memory system;

obtaining a first matrix using a plurality of elements corresponding to the storage data with the error;

obtaining a second matrix based on the equation coefficient corresponding to the exponent portion of each element in the first matrix; and calculating an inverse matrix of the second matrix, to obtain the error correction decoding inverse matrix.

17. The method of claim 15, wherein the method further comprises:

generating a corresponding equation coefficient matrix according to the elements;

generating a coding matrix based on the equation coefficient matrix; and performing a coding operation on storage data to be written to the memory system based on the coding matrix, to obtain check data corresponding to the storage data.

18. The method of claim 15, wherein the performing the error correction based on the error correction decoding inverse matrix comprises:

performing a decoding operation based on the error correction decoding inverse matrix, a remaining storage data without the error and a check data corresponding to the storage data, to obtain recovered storage data.

19. The method of claim 15, wherein the method further comprises:

performing a read operation on the storage data in the memory system;

in response to an error occurring to the read storage data, performing read retry processing on the storage data with the error;

in response to an error occurring to the storage data after performing the read retry processing, performing soft decoding processing on the storage data still with the error; and in response to an error occurring to the storage data after performing the soft decoding processing, performing an error correction through the error correction decoding inverse matrix.

20. A memory controller, wherein the memory controller comprises a control portion and an interface, and the control portion is configured to:

compress a first mapping table to obtain a second mapping table, wherein the first mapping table comprises a correspondence relation between an exponent portion of each element of elements corresponding to an error correction coding equation and an equation coefficient, and the exponent portions of the elements are a group of continuous data;

and the second mapping table comprises a correspondence relation between the exponent portions of part of the elements and the equation coefficients, and the exponent portions of the part of the elements comprise node data in the continuous data; and obtain the equation coefficient corresponding to the exponent portion of any element of the elements based on the node data in the second mapping table through a segmented query.

* * * * *